(12) United States Patent
Sato et al.

(10) Patent No.: US 8,514,801 B2
(45) Date of Patent: Aug. 20, 2013

(54) MOBILE STATION, BASE STATION, AND WIRELESS COMMUNICATION METHOD

(75) Inventors: Tomonori Sato, Kawasaki (JP); Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 13/015,948

(22) Filed: Jan. 28, 2011

(65) Prior Publication Data

US 2011/0189972 A1  Aug. 4, 2011

(30) Foreign Application Priority Data

Feb. 1, 2010 (JP) .................................... 2010-20744

(51) Int. Cl.
*H04W 4/22* (2009.01)
(52) U.S. Cl.
USPC ............ 370/329; 370/341; 370/437; 455/521
(58) Field of Classification Search
None
See application file for complete search history.

(56) References Cited

U.S. PATENT DOCUMENTS

| | | | | |
|---|---|---|---|---|
| 6,374,099 | B1* | 4/2002 | Bi et al. ..................... | 455/404.1 |
| 7,103,060 | B2 | 9/2006 | Kornprobst et al. | |
| 2003/0053438 | A1* | 3/2003 | Ogura et al. ................ | 370/347 |
| 2005/0037769 | A1* | 2/2005 | Jami et al. ................... | 455/453 |
| 2007/0004421 | A1* | 1/2007 | Chambers et al. ............ | 455/450 |
| 2007/0054664 | A1* | 3/2007 | Kim .......................... | 455/432.1 |
| 2008/0081607 | A1* | 4/2008 | Tangorra et al. ............. | 455/425 |
| 2008/0194259 | A1 | 8/2008 | Vujcic et al. | |
| 2009/0011769 | A1 | 1/2009 | Park et al. | |
| 2009/0016274 | A1* | 1/2009 | Nylander et al. ............ | 370/328 |
| 2010/0120395 | A1* | 5/2010 | Chiba et al. ................. | 455/404.2 |
| 2011/0171926 | A1* | 7/2011 | Faccin et al. ................ | 455/404.1 |
| 2012/0236810 | A1 | 9/2012 | Park et al. | |

FOREIGN PATENT DOCUMENTS

| | | |
|---|---|---|
| JP | 2001-078260 | 3/2001 |
| JP | 2002-016979 A | 1/2002 |
| JP | 2009-521892 | 6/2009 |
| JP | 2009-224885 A | 10/2009 |
| WO | WO-2007/078165 | 7/2007 |

OTHER PUBLICATIONS

"Extended European Search Report" mailed by EPO and corresponding to European application No. 11152758.6 on Apr. 19, 2011.
Japanese Office Action mailed Apr. 23, 2013 for corresponding Japanese Application No. 2010-020744, with partial English-language translation .

* cited by examiner

*Primary Examiner* — Hassan Phillips
*Assistant Examiner* — Duc Duong
(74) *Attorney, Agent, or Firm* — Fujitsu Patent Center

(57) ABSTRACT

A mobile station that performs wireless communication through a base station, includes a first connection setup request unit configured to make a first connection setup request for an emergency call and a normal call when communication performed in the communication region of the base station is in a congestion state, the emergency call and the normal call using a signal sequence that corresponds to a sequence number of a connection setup request signal used when communication performed in a communication region of the base station is in a normal state, and a second connection setup request unit configured to make a second connection setup request for another one of the emergency call and the normal call different from the first connection setup request, using a generated-signal sequence generated from the sequence number, when communication performed in the communication region of the base station is in the congestion state.

9 Claims, 30 Drawing Sheets

FIG. 13

| SEQUENCE NUMBER | PEAK POSITION | CORRELATION VALUE | | |
|---|---|---|---|---|
| | | ENTIRE TIME PERIOD | INTERVAL 0 | INTERVAL 1 |
| 1 | 5 | 485 | 415 | 71 |
| 2 | 5 | 458 | 11 | 453 |
| | 8 | 446 | 419 | 29 |
| | 15 | 843 | 414 | 429 |
| 3 | 8 | 455 | 24 | 445 |

FIG. 24

| TRANSMISSION INTERVAL | AMPLITUDE | CORRELATION VALUE/ INTERVAL | CORRELATION VALUE FOR ENTIRE TIME PERIOD |
|---|---|---|---|
| FOUR INTERVALS | A | 209 | 839 |
| THREE INTERVALS | (4/3)A | 279 | 839 |
| TWO INTERVALS | 2A | 419 | 839 |
| ONE INTERVAL | 4A | 839 | 839 |

FIG. 25

| PEAK | TIMING DISPLACEMENT | INTERVAL 0 | INTERVAL 1 | INTERVAL 2 | INTERVAL 3 |
|---|---|---|---|---|---|
| FIRST PEAK | 5 SAMPLES | O | O | × | × |
| SECOND PEAK | 10 SAMPLES | O | × | O | × |
| THIRD PEAK | 15 SAMPLES | O | O | O | O |

FIG. 26

| PEAK | TIMING DISPLACEMENT | ENTIRE TIME PERIOD | INTERVAL 0 | INTERVAL 1 | INTERVAL 2 | INTERVAL 3 |
|---|---|---|---|---|---|---|
| FIRST PEAK | 5 SAMPLES | 839 | 419 | 419 | 68 | 28 |
| SECOND PEAK | 10 SAMPLES | 839 | 419 | 102 | 419 | 39 |
| THIRD PEAK | 15 SAMPLES | 839 | 209 | 209 | 209 | 209 |

FIG. 27

| PEAK | TIMING DISPLACEMENT | ENTIRE TIME PERIOD | INTERVAL 0 | INTERVAL 1 | INTERVAL 2 | INTERVAL 3 |
|---|---|---|---|---|---|---|
| (None) | ~ | ~ | ~ | ~ | ~ | ~ |

US 8,514,801 B2

MOBILE STATION, BASE STATION, AND WIRELESS COMMUNICATION METHOD

CROSS-REFERENCE TO RELATED APPLICATION

This application is based upon and claims the benefit of priority of the prior Japanese Patent Application No. 2010-20744, filed on Feb. 1, 2010, the entire contents of which are incorporated herein by reference.

FIELD

Embodiments discussed herein relate to a mobile station, a base station, and a wireless communication method.

BACKGROUND

Usually, in a wireless communication system that includes a mobile station and a base station, at the time of initial access, reconnection, or handover, a mobile station carries out a negotiation operation by transmitting a connection setup request signal for a connection setup request to a base station. In addition, in recent years, the standardization of Long Term Evolution (LTE) that is one of the specifications relating to data communication in a wireless communication system has been promoted in the 3rd Generation Partnership Project (3GPP).

The initial access being taken as an example of the negotiation, the mobile station arbitrarily selects the sequence number of a connection setup request signal, and transmits the connection setup request signal to the base station. In this regard, however, when the mobile station makes a connection setup request, resources that use a connection setup request signal are not divided depending on whether a call is an emergency call or a nonemergency normal call. Therefore, in a case in which the connection setup request is made, when a congestion state occurs owing to heavy traffic on the lines, the connection setup request is likely to be made using a signal sequence that corresponds to the same sequence number, and hence the competition between connection setup requests occurs. Therefore, emergency calls that are expected to be preferentially connected may also be congested.

Accordingly, in recent years, there has been proposed a technique in which resources for connection setup request signals are grouped for individual objects of connection setup requests. Here, a processing flow of the related art in which resources are grouped for individual objects of connection setup requests will be described with reference to FIG. 30. FIG. 30 is a flowchart of a processing operation of the related art in which resources are grouped for individual objects of connection setup requests. In addition, in FIG. 30, a mobile station is indicated as user equipment (UE), and a base station is indicated as an evolutional Node B (eNB).

For example, the eNB performs the grouping of random access channel (RACH) resources, and transmits the grouping result as system information or a paging message to the UE. For example, the RACH resources means resources, which are common channels that a plurality of UEs may use, for individual objects such as initial access, handover, synchronization retention, access termination, a wireless resource request, and the like. In other words, for example, the grouping of the RACH resources means that resources for the individual objects are divided among connection setup request signals that are used for normal calls or emergency calls.

On the other hand, for example, the UE selects a signature and a RACH event, and makes a connection setup request to the eNB. In addition, for example, when the eNB receives the connection setup request from the UE, the eNB transmits to the UE a connection setup request response that is a response for the connection setup request. After that, for example, when the UE receives the connection setup request response from the eNB, the UE transmits uplink data to the eNB.

SUMMARY

According to an aspect of the embodiments discussed herein, a mobile station that performs wireless communication through a base station, includes a first connection setup request unit configured to make a first connection setup request for one of an emergency call and a normal call when communication performed in the communication region of the base station is in a congestion state, the one of the emergency call and the normal call using a signal sequence that corresponds to a sequence number of a connection setup request signal used when communication performed in a communication region of the base station is in a normal state, and a second connection setup request unit configured to make a second connection setup request for another one of the emergency call and the normal call different from the first connection setup request, using a generated-signal sequence generated from the sequence number, when communication performed in the communication region of the base station is in the congestion state.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 13 is a diagram illustrating an example of summarization of correlation value calculation results for sequence numbers "1", "2", and "3" in an example of incoming timing;

FIG. 24 is a diagram illustrating an example of a relationship between maximum value of correlation values based on the number of intervals in an example, in which the transmission interval is divided in quarters, according to the fourth embodiment;

FIG. 25 is a diagram illustrating an example of a transmission pattern at each peak in an example, in which the transmission interval is divided in quarters, according to the fourth embodiment;

FIG. 26 is a diagram illustrating an example of a correlation result for a sequence number xx=0 in an example, in which the transmission interval is divided in quarters, according to the fourth embodiment;

FIG. 27 is a diagram illustrating an example of a correlation result for a sequence number xx=1 in an example, in which the transmission interval is divided in quarters, according to the fourth embodiment;

DESCRIPTION OF EMBODIMENTS

First Embodiment

Figure 1:
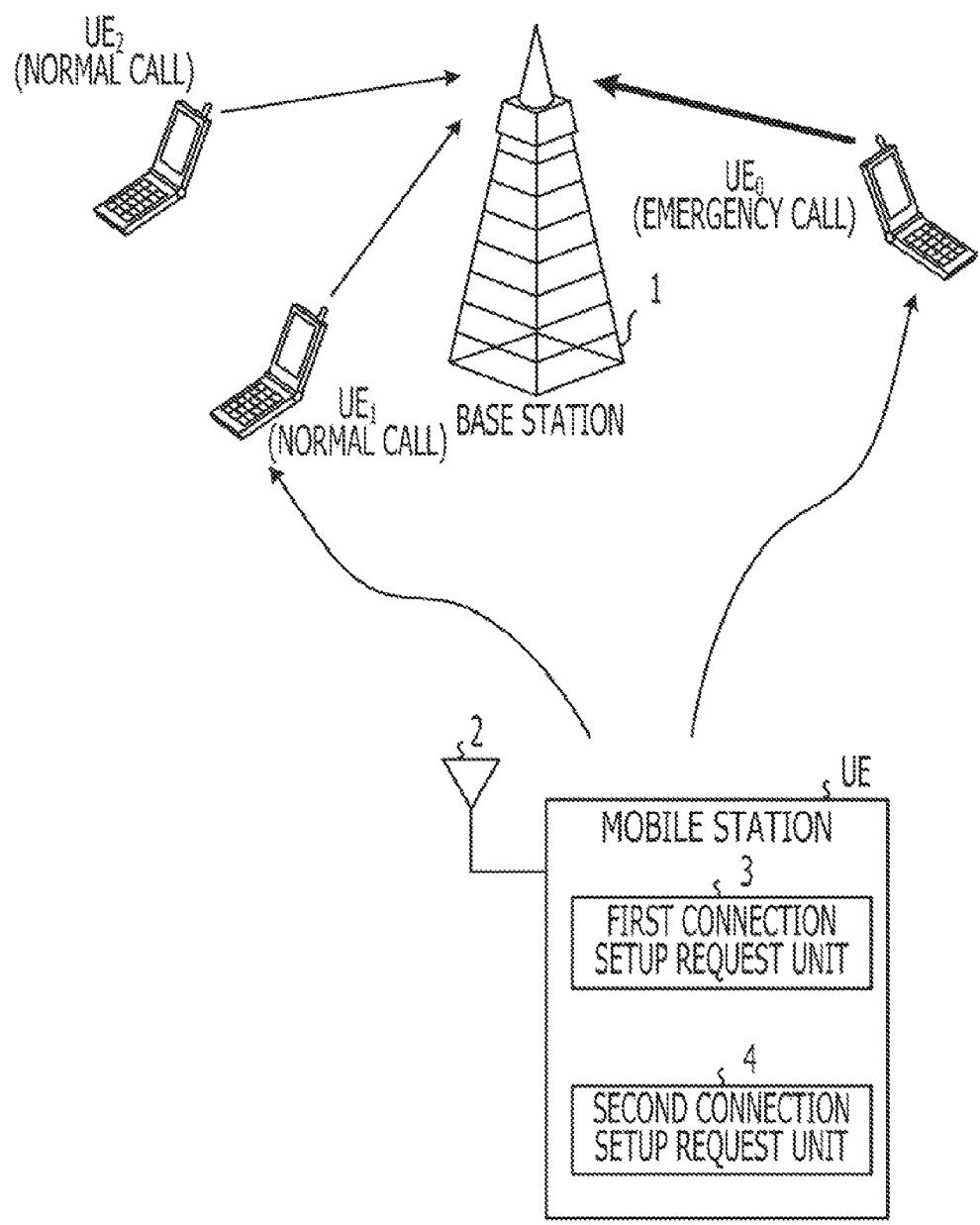
FIG. 1 is a diagram illustrating an example of a configuration of a mobile station according to a first embodiment.

An example of the configuration of a mobile station according to a first embodiment will be described with reference to FIG. 1. FIG. 1 is a diagram illustrating an example of the configuration of the mobile station according to the first embodiment.

For example, as illustrated in FIG. 1, the mobile station UE includes an antenna 2, a first connection setup request unit 3, and a second connection setup request unit 4. In addition, for example, the mobile station establishes wireless communication with other mobile stations, various kinds of devices, and the like through the antenna 2 and a base station 1. In FIG. 1, a case is illustrated in which a $UE_0$, a $UE_1$, and a $UE_2$ as mobile stations (User Equipments: UEs) perform wireless communication through the base station 1. Hereinafter, as an example of the mobile station UE, a case will be described in which 64 sequence numbers are used in Long Term Evolution (LTE), and the mobile station makes a connection setup request necessary for initial access.

In such a configuration as described above, when communication performed in the coverage area (communication region) of the base station 1 is in a congestion state, the first connection setup request unit 3 makes a connection setup request for one of an emergency call and a normal call, using a signal sequence that corresponds to a sequence number of a connection setup request signal used when the communication is in a normal state.

Specifically, the first connection setup request unit 3 determines that the communication performed in the coverage area of the base station 1 is in the congestion state. The determination of the congestion state is performed on the basis of a notification from the base station 1, which indicates that communication performed in a cell that is the coverage area of a given base station is in the congestion state, or the occurrence of a time interval during which negotiation with the base station 1 is performed in response to a connection setup request made by the mobile station that is longer than a normal time interval.

In addition, the first connection setup request unit 3 makes a connection setup request for an emergency call that is an urgent connection setup request such as a call to police, a call for an ambulance, or the like, using a signal sequence that corresponds to a sequence number "1" of a connection setup request signal used when communication performed in the coverage area of the base station 1 is in a normal state. For example, in the example illustrated in FIG. 1, when communication is in the congestion state, a $UE_0$ (mobile station that makes an emergency call) makes a connection setup request to the base station 1 using a signal sequence that corresponds to the sequence number "1" of a connection setup request signal used when communication is in a normal state.

When communication performed in the coverage area of the base station 1 is in a congestion state, the second connection setup request unit 4 makes a connection setup request for the other call different from the connection setup request used by the first connection setup request unit 3, using a generated-signal sequence generated from a sequence number of a connection setup request signal used when the communication is in the normal state.

Specifically with reference to the example described above, the second connection setup request unit 4 determines that the communication performed in the coverage area of the base station 1 is in the congestion state. In the same way, the determination of the congestion state is performed on the basis of the notification from the base station 1, which indicates that communication performed in a cell that is the coverage area of a given base station is in the congestion state, or the occurrence of a time interval during which negotiation with the base station 1 is performed in response to a connection setup request made by the mobile station that is longer than a normal time interval.

In addition, the second connection setup request unit 4 makes a connection setup request for a normal call that is the other call different from the emergency call used by the first connection setup request unit 3, using a generated-signal sequence generated from a sequence number "1 (anterior half)+33 (posterior half)" of a connection setup request signal used when the communication is in the normal state. For example, in the example illustrated in FIG. 1, when communication is in the congestion state, a $UE_1$ (mobile station that makes a normal call) makes a connection setup request using a generated-signal sequence generated from the sequence number "1 (anterior half)+33 (posterior half)". In addition, for example, in the example illustrated in FIG. 1, when communication is in the congestion state, a $UE_2$ (mobile station that makes a normal call) makes a connection setup request using a generated-signal sequence generated from a sequence number "2 (anterior half)+34 (posterior half)". In addition, for example, a combination method for the sequence number may be any method if the first connection setup request unit 3 and the second connection setup request unit 4 do not use the same sequence number.

In addition, in the example described above, the case has been described in which a signal sequence, which corresponds to a sequence number of a connection setup request signal used when communication is in a normal state, is used for an emergency call, and a generated-signal sequence, generated from a sequence number of a connection setup request signal used when the communication is in the normal state, is used for a normal call. However, the emergency call and the normal call may be reversed with respect to a signal sequence to be used. Specifically, the first connection setup request unit 3 makes a connection setup request for a normal call to the base station 1, using a signal sequence that corresponds to the sequence number "1" of a connection setup request signal used when communication is in a normal state. In addition, the second connection setup request unit 4 makes a connection setup request for an emergency call that is the other call different from the normal call used by the first connection setup request unit 3, using a generated-signal sequence generated from the sequence number "1 (anterior half)+33 (posterior half)" of a connection setup request signal used when the communication is in the normal state.

Here, in a technique that resources are divided among individual objects, namely, resources for connection setup request signals to be used are divided among emergency calls and normal calls, the number of resources used for the individual objects may decrease, and a connection for a connection setup request may be deteriorated.

For example, in a case in which the UE uses 64 sequence numbers at the time of initial access, and 34 sequence numbers and 30 sequence numbers are assigned to a normal call and an emergency call, respectively, even if a congestion state occurs, another sequence number assigned to the emergency call is impossible for the normal call to use, or another sequence number assigned to the normal call is impossible for the emergency call to use. In addition, in a state in which the number of resources used for the individual objects decreases owing to the congestion state, when the number of UEs that make connection setup requests for emergency calls increases, the competition between signal sequences that correspond to the same sequence number occurs, and hence it takes extra time to connect an emergency call that is expected to be preferentially connected.

In addition, in a technique that, regardless of a congestion state, resources are preliminarily allocated to individual objects, a situation may occur in which some resources are not used, and hence it is difficult to effectively use limited resources. In short, when the limited resources are divided among individual objects, the number of resources is restricted for each object, and hence the congestion state may easily occur. As these results, in the technique, connection for a connection setup request is deteriorated.

According to the first embodiment, when communication goes into a congestion state, the mobile station uses a sequence number used when communication is in a normal state, and makes call a request using a signal sequence for each of an emergency call and a normal call. As a result, since the mobile station may use all resources for an unspecified object without resources being divided among individual objects, the congestion state is not likely to occur, and the deterioration of connection for a connection setup request may be suppressed.

Second Embodiment (Connection Setup in Normal State According to Second Embodiment)

Figure 2:
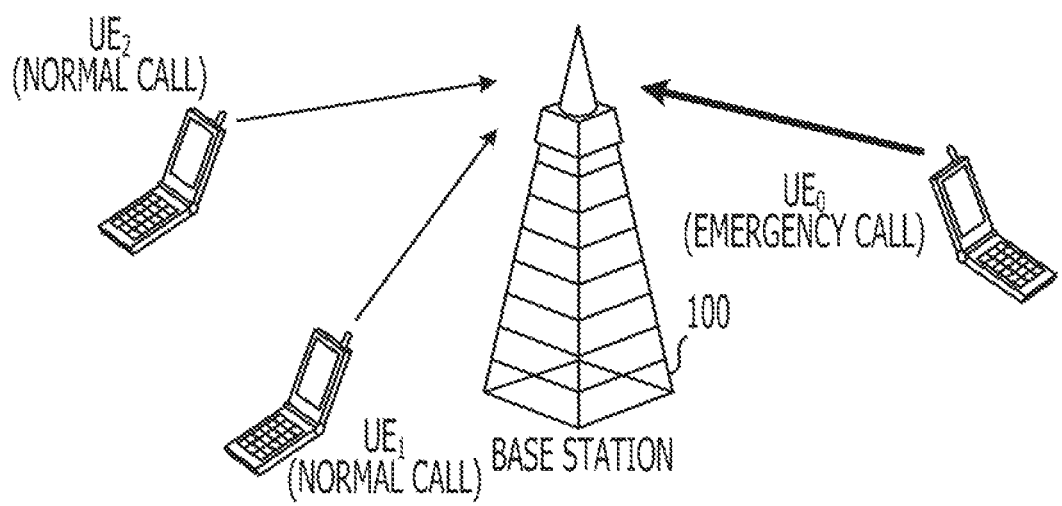
FIG. 2 is a diagram illustrating an example of a configuration of a wireless communication system that includes a mobile station in a normal state according to a second embodiment.

An example of a connection setup performed in a mobile station in a normal state according to a second embodiment will be described with reference to FIG. 2. FIG. 2 is a diagram illustrating an example of a configuration of a wireless communication system that includes a mobile station in a normal state according to the second embodiment. In addition, the normal state means a state in which no congestion occurs in the coverage area of a base station. In addition, the mobile station is indicated as a UE ($UE_0$, $UE_1$, and $UE_2$) in FIG. 2. Hereinafter, as an example of the mobile station, a case will be described in which 64 sequence numbers are used in LTE, and the mobile station makes a connection setup request necessary for initial access.

For example, as illustrated in FIG. 2, the wireless communication system includes a base station 100, a $UE_0$ as a mobile station (mobile station that makes an emergency call), a $UE_1$ as a mobile station (mobile station that makes a normal call), and a $UE_2$ as a mobile station (mobile station that makes a normal call). In such a configuration as described above, for example, the base station 100 performs a statistical processing operation for a connection setup request signal, in which the number of requests of all connection setup request signals based on individual mobile station existing in the coverage area of the base station 100 itself is taken into account.

In addition, when it is determined on the basis of the statistical processing result for connection setup request signals that no congestion state occurs, the base station 100 sets "0 (normal state)" to a congestion state bit included in an broadcast signal, and notifies all mobile stations of the broadcast signal. In addition, individual mobile stations detect it from the congestion state bit included in the broadcast signal that the base station 100 gives notice of that communication is in a normal state. On the other hand, for example, in a case in which initial access is performed in the normal state, while randomly selecting a sequence number used for a connection setup request from among 64 sequence numbers, each of the mobile stations makes a connection setup request to the base station 100 using a signal sequence that corresponds to the selected sequence number, thereby connecting to the base station 100.

Figure 3:
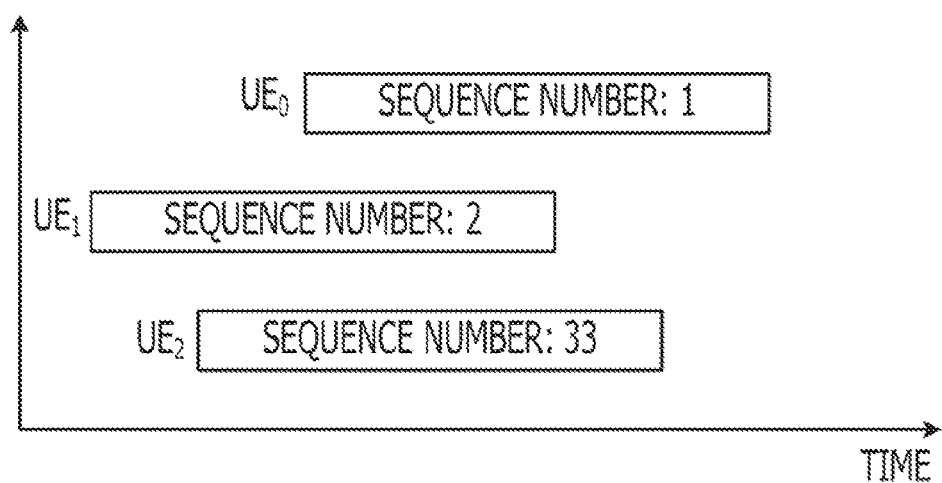
FIG. 3 is a diagram illustrating a usage example of a sequence number used by a mobile station in a normal state according to the second embodiment.

Here, a usage example of a sequence number used by the mobile station in the normal state according to the second embodiment will be described with reference to FIG. 3. FIG. 3 is a diagram illustrating the usage example of the sequence number used by the mobile station in the normal state according to the second embodiment. In addition, in FIG. 3, a horizontal axis indicates time. In addition, each of the UEs outputs through a time period indicated in FIG. 3 a signal sequence that corresponds to each of sequence numbers.

For example, as illustrated in FIG. 3, in such a configuration as illustrated in FIG. 2, the $UE_0$ randomly selects a sequence number "1" of a connection setup request signal used when communication is in a normal state, and makes a connection setup request (emergency call) to the base station 100 using a signal sequence that corresponds to the selected sequence number, thereby connecting to the base station 100. In addition, for example, in such a configuration as illustrated in FIG. 2, the $UE_1$ randomly selects a sequence number "3" of a connection setup request signal used when communication is in a normal state, and makes a connection setup request (normal call) to the base station 100 using a signal sequence that corresponds to the selected sequence number, thereby connecting to the base station 100. In addition, for example, in such a configuration as illustrated in FIG. 2, the $UE_2$ randomly selects a sequence number "34" of a connection setup request signal used when communication is in a normal state, and makes a connection setup request (normal call) to the base station 100 using a signal sequence that corresponds to the selected sequence number, thereby connecting to the base station 100.

In short, in the normal state, the mobile station randomly selects a sequence number used for a connection setup request, without separating sequence numbers as limited resources for an emergency call and a normal call, and makes a connection setup request to the base station 100 using a signal sequence that corresponds to the selected sequence number.

(Connection setup in Congestion State According to Second Embodiment)

Figure 4:
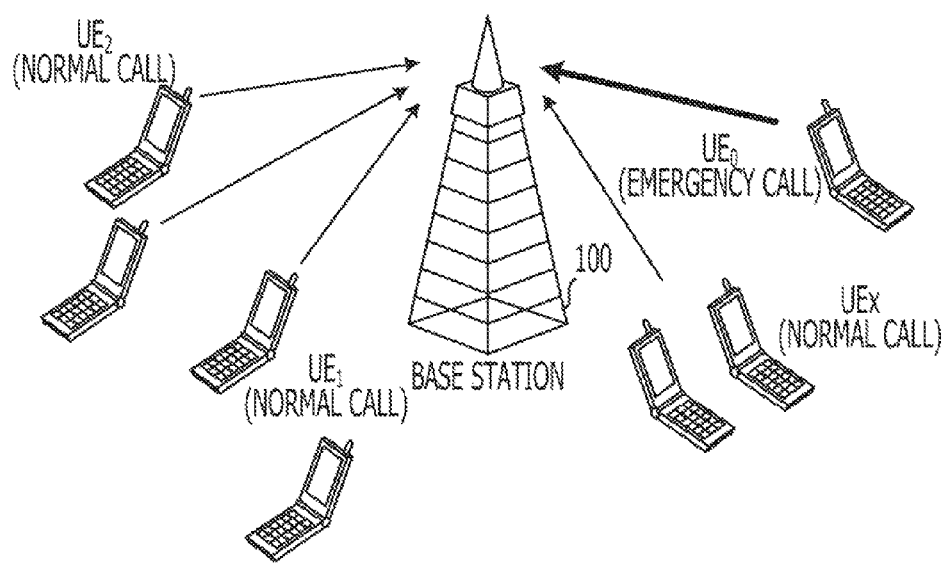
FIG. 4 is a diagram illustrating an example of a configuration of a wireless communication system that includes a mobile station in a congestion state according to the second embodiment.

An example of a connection setup performed in a mobile station in a congestion state according to the second embodiment will be described with reference to FIG. 4. FIG. 4 is a diagram illustrating an example of the configuration of a wireless communication system that includes a mobile station in a congestion state according to the second embodiment. In addition, the congestion state means a state in which congestion occurs in the coverage area of the base station 100. In addition, the mobile station is indicated as a UE ($UE_0$, $UE_1$, $UE_2$, and $UE_x$) in FIG. 4. Hereinafter, in the same way, as an example of the mobile station, a case will be described in which 64 sequence numbers are used in LTE, and the mobile station makes a connection setup request necessary for initial access.

For example, as illustrated in FIG. 4, the wireless communication system includes a base station 100, a $UE_0$ as a mobile station (mobile station that makes an emergency call), a $UE_1$ as a mobile station (mobile station that makes a normal call), a $UE_2$ as a mobile station (mobile station that makes a normal call), and a $UE_x$ as a mobile station (mobile station that makes a normal call). In such a configuration as described above, for example, the base station 100 performs a statistical processing operation for a connection setup request signal, in which the number of requests of all connection setup request signals based on individual mobile station existing in the coverage area of the base station 100 itself is taken into account.

In addition, when it is determined on the basis of the statistical processing result for connection setup request signals that a congestion state occurs, the base station 100 sets "1 (congestion state)" to a congestion state bit included in an broadcast signal, and notifies all mobile stations of the broadcast signal. In addition, individual mobile stations detect it from the congestion state bit included in the broadcast signal that the base station 100 gives notice of that communication is in the congestion state.

On the other hand, for example, in a case in which initial access is performed in the congestion state, while randomly selecting a sequence number used for a connection setup request from among the 64 sequence numbers, the mobile station that makes an emergency call makes a connection setup request to the base station 100 using a signal sequence that corresponds to the selected sequence number, thereby connecting to the base station 100. In addition, for example, in a case in which initial access is performed in the congestion state, the mobile station that makes a normal call generates a signal sequence (generated-signal sequence) from the combination of sequence numbers of a plurality of connection setup request signals used when communication is in the normal state, and makes a connection setup request to the base station 100, thereby connecting to the base station 100.

Figure 5:
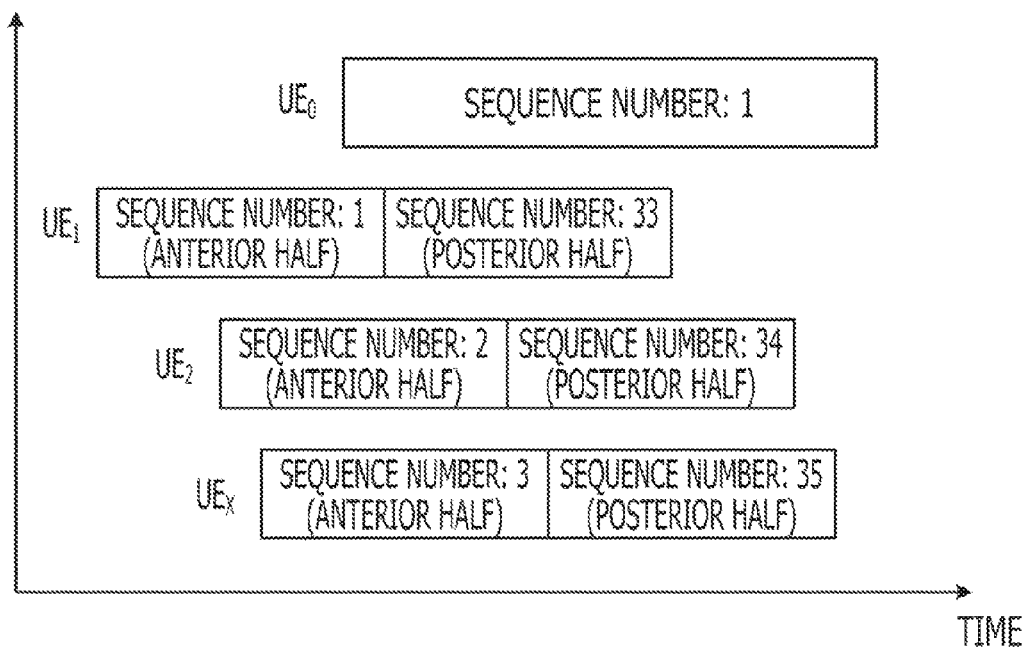
FIG. 5 is a diagram illustrating a usage example of a sequence number used by a mobile station in a congestion state according to the second embodiment.

Here, a usage example of a sequence number used by a mobile station in the congestion state according to the second embodiment will be described with reference to FIG. 5. FIG. 5 is a diagram illustrating the usage example of the sequence number used by the mobile station in the congestion state according to the second embodiment. In addition, in FIG. 5, a horizontal axis indicates time. In addition, each of the UEs outputs through a time period indicated in FIG. 5 a signal sequence that corresponds to each of sequence numbers.

For example, as illustrated in FIG. 5, in such a configuration as illustrated in FIG. 4, the $UE_0$ randomly selects a sequence number "1" of a connection setup request signal used when communication is in a normal state, and makes a connection setup request (emergency call) to the base station 100 using a signal sequence that corresponds to the selected sequence number, thereby connecting to the base station 100. In addition, for example, in such a configuration as illustrated in FIG. 4, the $UE_1$ generates a signal sequence (generated-signal sequence) from "1 (anterior half)+33 (posterior half)" that is the combination of the sequence number "1" and a sequence number "33" of connection setup request signals used when communication is in the normal state. In addition, the $UE_1$ makes a connection setup request (normal call) to the base station 100 using a signal sequence that corresponds to the generated generated-signal sequence.

In addition, for example, in such a configuration as illustrated in FIG. 4, the $UE_2$ generates a signal sequence (generated-signal sequence) from "2 (anterior half)+34 (posterior half)" that is the combination of a sequence number "2" and a sequence number "34" of connection setup request signals used when communication is in the normal state. In addition, the $UE_2$ makes a connection setup request (normal call) to the base station 100 using the generated generated-signal sequence. In addition, for example, in such a configuration as illustrated in FIG. 4, the $UE_x$ randomly generates a signal sequence (generated-signal sequence) from "3 (anterior half)+35 (posterior half)" that is the combination of a sequence number "3" and a sequence number "35" of connection setup request signals used when communication is in the normal state. In addition, the $UE_x$ makes a connection setup request (normal call) to the base station 100 using the generated generated-signal sequence.

The generated-signal sequence is generated by combining sequence numbers of connection setup request signals used when communication is in the normal state. As an example of a combination method for a sequence number, there is a method in which the combination of sequence numbers is obtained on the basis of (x+32) mod 64 (x: a sequence number used when communication is in the normal state). For example, when a sequence number used when communication is in the normal state is "1", a sequence number "33" is obtained. Therefore, a sequence number is obtained as "1 (anterior half)+33 (posterior half)".

Namely, in the congestion state, with respect to sequence numbers as limited resources, the mobile station makes a connection setup request for a normal call using a generated-signal sequence generated on the basis of the combination of sequence numbers.

(Configuration of Base Station According to Second Embodiment)

Figure 6:
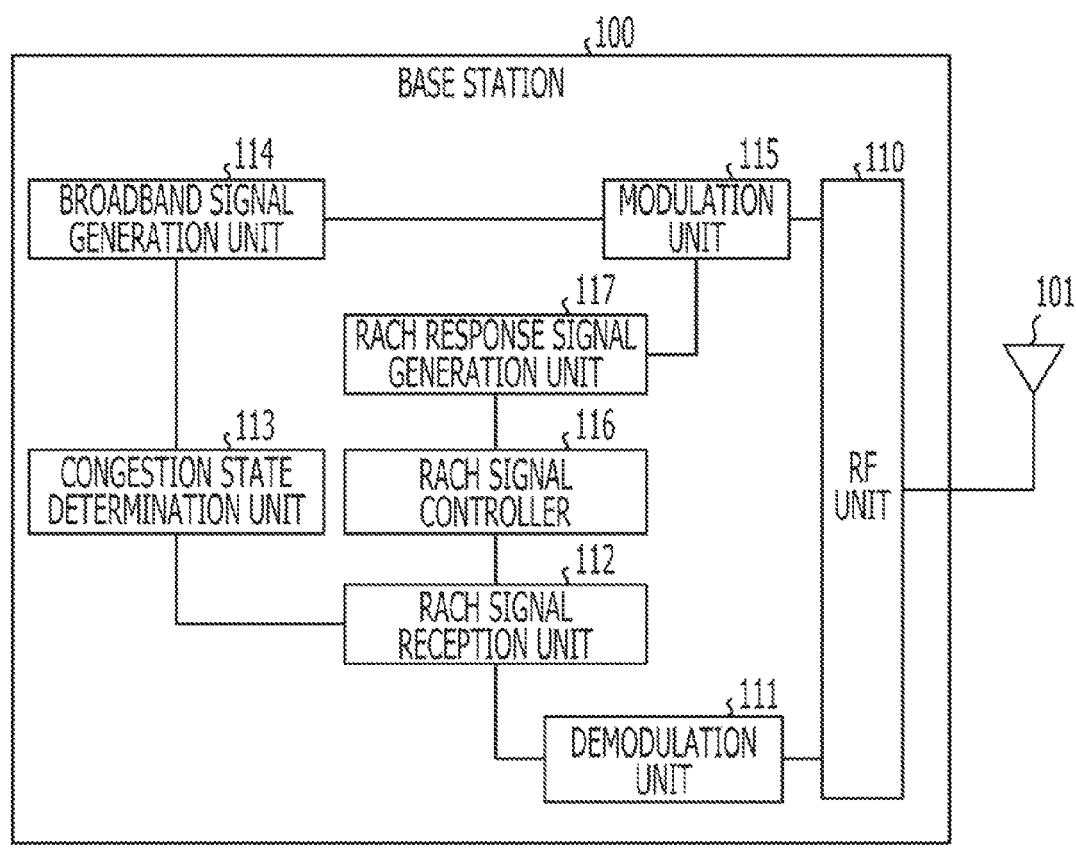
FIG. 6 is a diagram illustrating an example of a configuration of a base station according to the second embodiment.

An example of the configuration of a base station 100 according to the second embodiment will be described with reference to FIG. 6. FIG. 6 is a diagram illustrating the example of the configuration of the base station 100 according to the second embodiment.

For example, as illustrated in FIG. 6, a base station 100 includes an antenna 101, a radio frequency (RF) unit 110, a demodulation unit 111, an RACH signal reception unit 112, a congestion state determination unit 113, an broadcast signal generation unit 114, and a modulation unit 115. In addition, for example, as illustrated in FIG. 6, the base station 100 includes an RACH signal controller 116, an RACH response signal generation unit 117. In addition, for example, each processing unit is an integrated circuit such as an application specific integrated circuit (ASIC), a field programmable gate array (FPGA), or the like or an electronic circuit such as a central processing unit (CPU), a micro processing unit (MPU), or the like.

For example, the antenna 101 transmits and receives various kinds of information input to and output from the base station 100. For example, the RF section 110 controls data transmission transmitted and received by the base station 100. For example, the demodulation unit 111 demodulates a signal received through the antenna 101 and the RF section 110.

For example, the RACH signal reception unit 112 carries out processing operations such as detection of a sequence number of a connection setup request signal demodulated by the demodulation unit 111, power detection, and the like. In addition, a detail of the RACH signal reception unit 112 will be described later. For example, the congestion state determination unit 113 determines on the basis of the processing result of the RACH signal reception unit 112 whether or not the coverage area of the base station 100 is in a congestion state.

For example, the broadcast signal generation unit 114 generates an broadcast signal that includes the information of the determination result by the congestion state determination unit 113, which relates to the congestion state. For example, the modulation unit 115 modulates a signal to be transmitted through the RF section 110 and the antenna 101. For example, on the basis of signal information for establishing a link necessary for a connection setup request signal, the RACH signal controller 116 controls response signals for a connection setup request, a connection request, and the like. For example, on the basis of a signal supplied from the RACH signal controller 116, the RACH response signal generation unit 117 generates transmission signals such as a connection setup request response, a connection request response, and the like.

Figure 7:
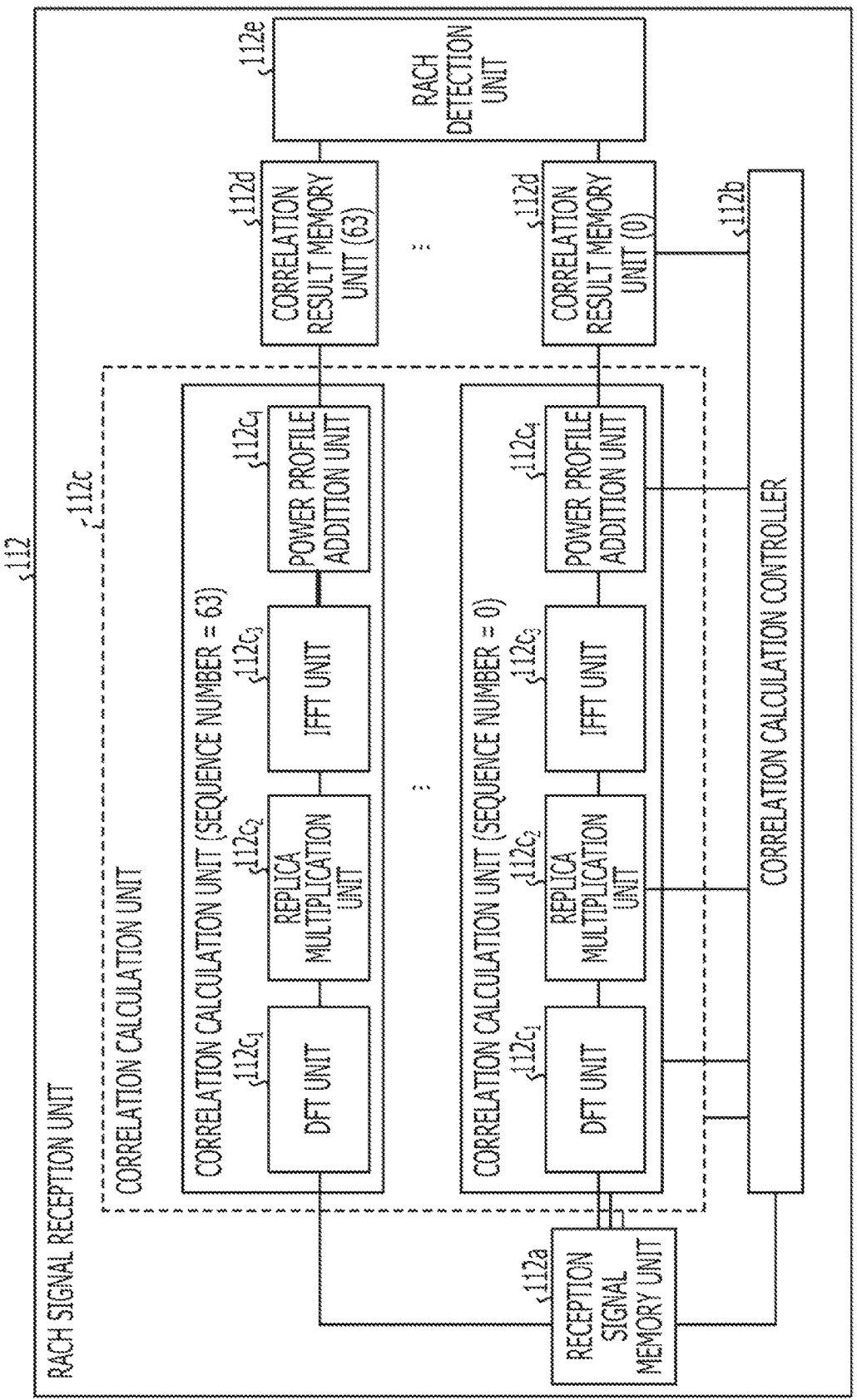
FIG. 7 is a diagram illustrating a detail of an RACH signal reception unit in the base station according to the second embodiment.

Next, a detail of the RACH signal reception unit 112 in the base station 100 according to the second embodiment will be described with reference to FIG. 7. FIG. 7 is a diagram illustrating the detail of the RACH signal reception unit 112 in the base station 100 according to the second embodiment.

For example, as illustrated in FIG. 7, the RACH signal reception unit 112 includes a reception signal memory unit 112a, a correlation calculation controller 112b, a correlation calculation unit 112c, a correlation result memory unit 112d, and an RACH detection unit 112e. In addition, for example, as illustrated in FIG. 7, the correlation calculation unit 112c includes a discrete Fourier transform (DFT) unit 112c1 and a Replica multiplication unit 112c2. In addition, the correlation calculation unit 112c includes an inverse fast Fourier transform (IFFT) unit 112c3 and a power profile addition unit 112c4.

For example, the reception signal memory unit 112a causes a given memory to store a reception signal demodulated by the demodulation unit 111. For example, in order to evaluate correlation values for the entire time period of a connection setup request signal transmitted from the mobile station and the individual intervals thereof, the correlation calculation controller 112b controls timing that relates to the selection of a connection setup request signal sequence, performed in the correlation calculation unit 112c, the specification of a storage location in a memory in which an addition result is stored, and the like. For example, the correlation calculation units 112c are disposed according to the number of 64 that corresponds to connection setup request signal sequences 0 to 63. In addition, the contents of processing operations performed in the individual correlation calculation units that correspond to the sequence numbers 0 to 63 are the same.

For example, the DFT unit 112c1 from among these units converts the reception signal onto a frequency axis. In addition, for example, the Replica multiplication unit 112c2 stores in a memory in advance a connection setup request signal sequence that is preliminarily subjected by the DFT unit 112c1 to DFT, and multiplies the stored connection setup request signal sequence by a reception signal newly subjected to DFT. In addition, for example, the IFFT unit 112c3 converts an output from the Replica multiplication unit 112c2 onto the frequency axis. In addition, for example, with respect to an output from the IFFT unit 112c3, the power profile addition unit 112c4 performs power addition and evaluates a correlation value.

For example, the correlation result memory unit 112d stores in a memory addition results that correspond to the entire time period of a connection setup request signal sequence and the individual intervals thereof, respectively, which are evaluated by the power profile addition unit 112c4. For example, on the basis of information of the addition results stored by the correlation result memory unit 112d, the RACH detection unit 112e performs power detection, path detection, the calculation of a timing displacement (timing advance), and the detection of the combination of connection setup request signals.

Here, the characteristic of a mobile station, which emerges on the basis of the above-mentioned correlation value calculation performed in the RACH signal reception unit 112, will be described with reference to FIGS. 8 to 13.

Figure 8:
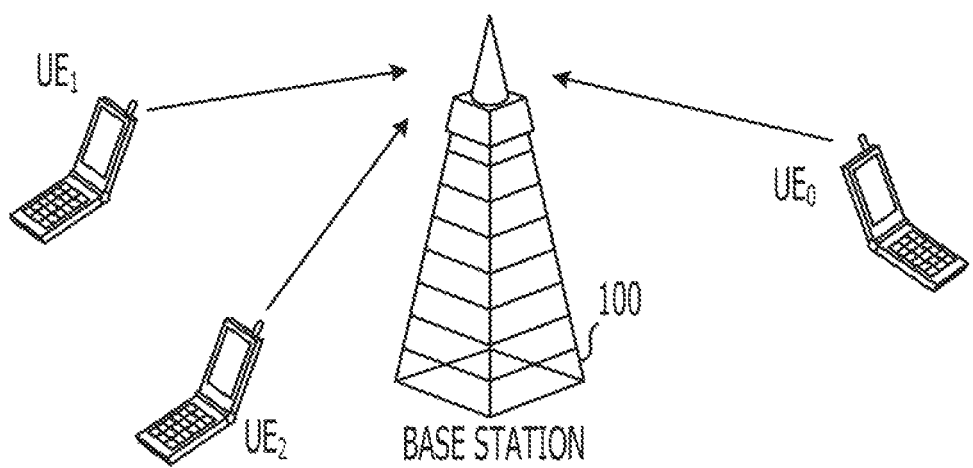
FIG. 8 is a diagram illustrating an example of incoming timing.
Figure 9:
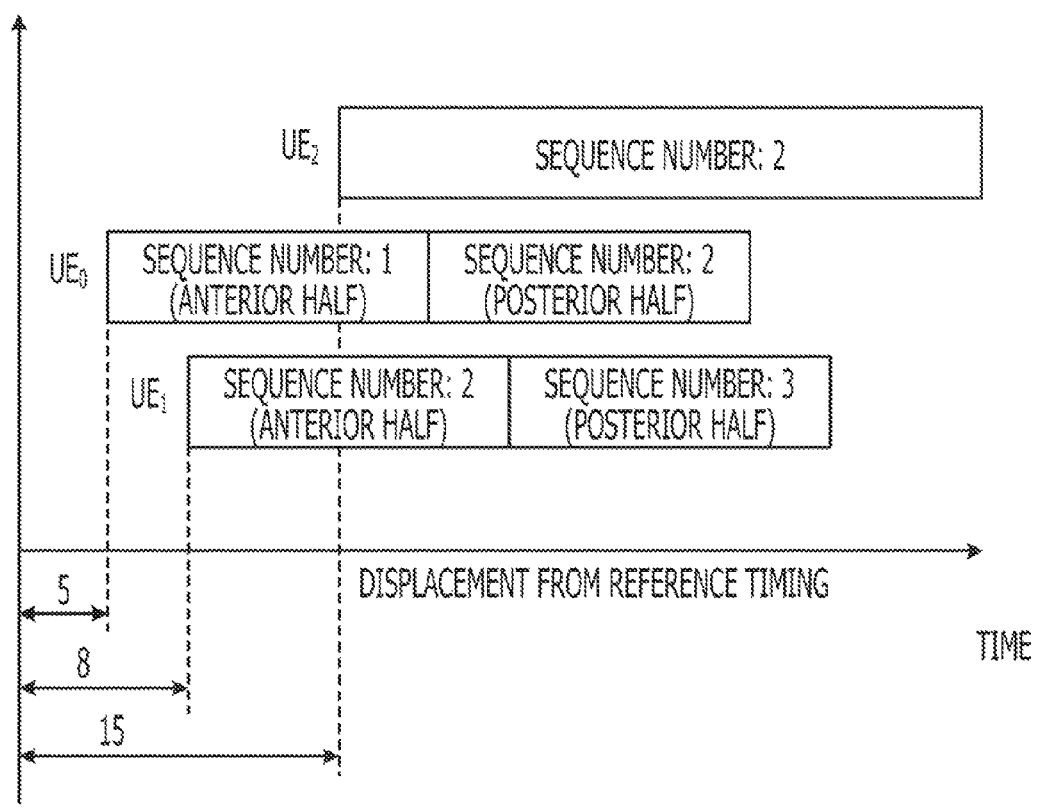
FIG. 9 is a diagram illustrating an example of timing advance.

First, incoming timing and timing advance will be described with reference to FIGS. 8 and 9. FIG. 8 is a diagram illustrating an example of the incoming timing, and FIG. 9 is a diagram illustrating an example of the timing advance.

For example, in FIG. 8, in a wireless communication system that includes a base station 100 and mobile stations, a $UE_0$ is a mobile station whose distance from the base station 100 is smallest, a $UE_1$ is a mobile station whose distance from the base station 100 is smallest but the $UE_0$, and a $UE_2$ is a mobile station whose distance from the base station 100 is smallest but the $UE_0$ and the $UE_1$.

In such a configuration as described above, for example, as illustrated in FIG. 9, the $UE_0$ uses a sequence number "1 (anterior half)+2 (posterior half)". In addition, for example, as illustrated in FIG. 9, the $UE_1$ uses a sequence number "2 (anterior half)+3 (posterior half)". In addition, for example, as illustrated in FIG. 9, the $UE_2$ uses a sequence number "2". In short, the $UE_2$ corresponds to an emergency call in a congestion state, and the $UE_0$ and $UE_1$ correspond to normal calls in the congestion state. In addition, for example, timing displacements (timing advance) from the base station 100 correspond to "5 samples", "8 samples", and "15 samples" in the $UE_0$, the $UE_1$, and the $UE_2$, respectively.

Figure 10:
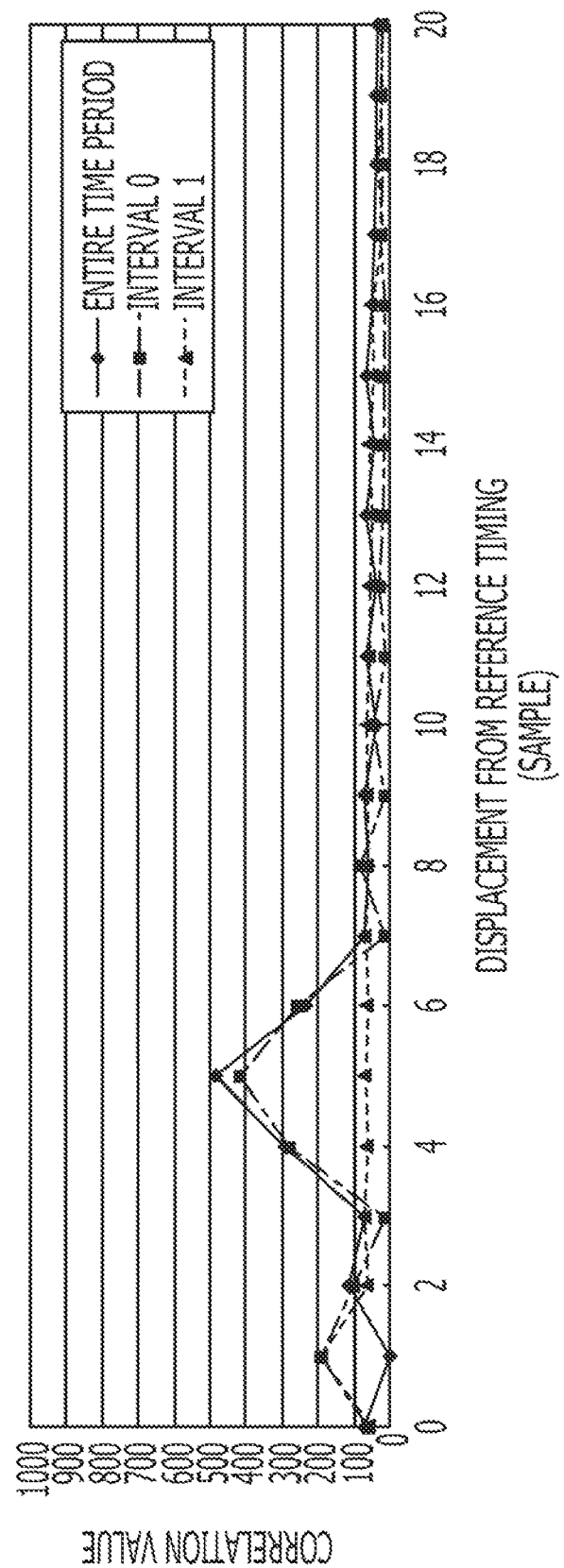
FIG. 10 is a diagram illustrating an example of a correlation value calculation result for a sequence number "1" in an example of incoming timing.
Figure 11:
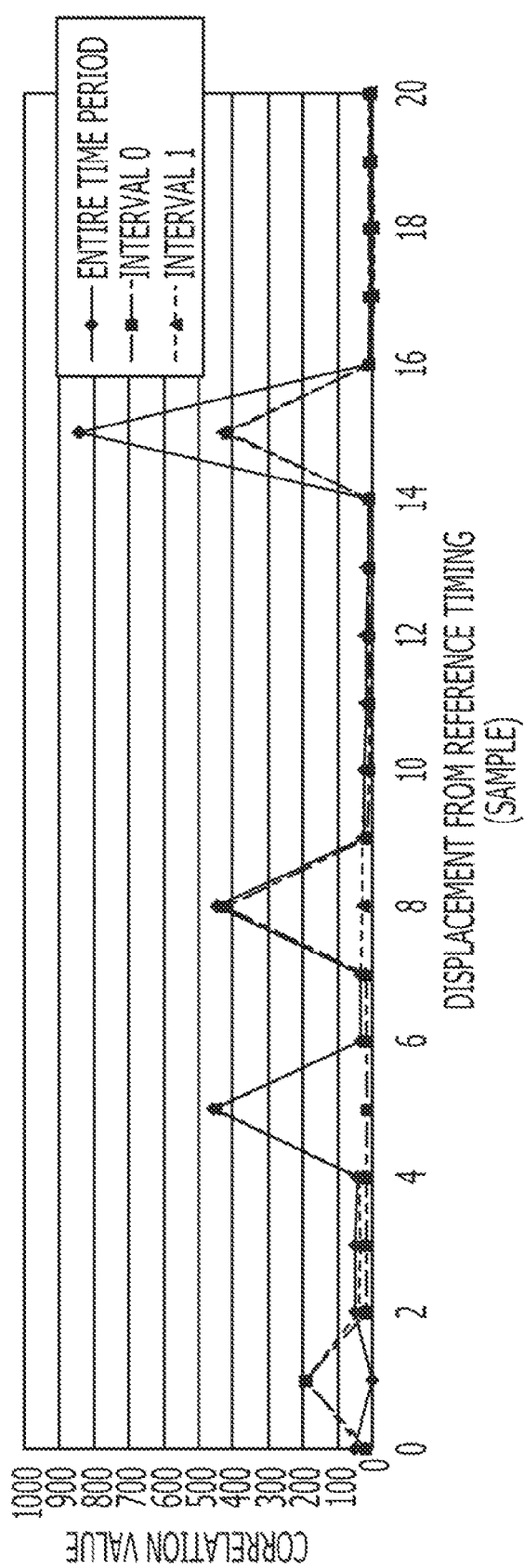
FIG. 11 is a diagram illustrating an example of a correlation value calculation result for a sequence number "2" in an example of incoming timing.

Next, examples of correlation value calculation results of individual sequence numbers in an example of incoming timing will be described with reference to FIGS. 10 to 12. FIG. 10 is a diagram illustrating an example of a correlation value calculation result for the sequence number "1" in the example of incoming timing. In addition, FIG. 11 is a diagram illustrating an example of a correlation value calculation result for the sequence number "2" in the example of incoming timing. In addition, FIG. 12 is a diagram illustrating an example of a correlation value calculation result for the sequence number "3" in the example of incoming timing.

Figure 12:
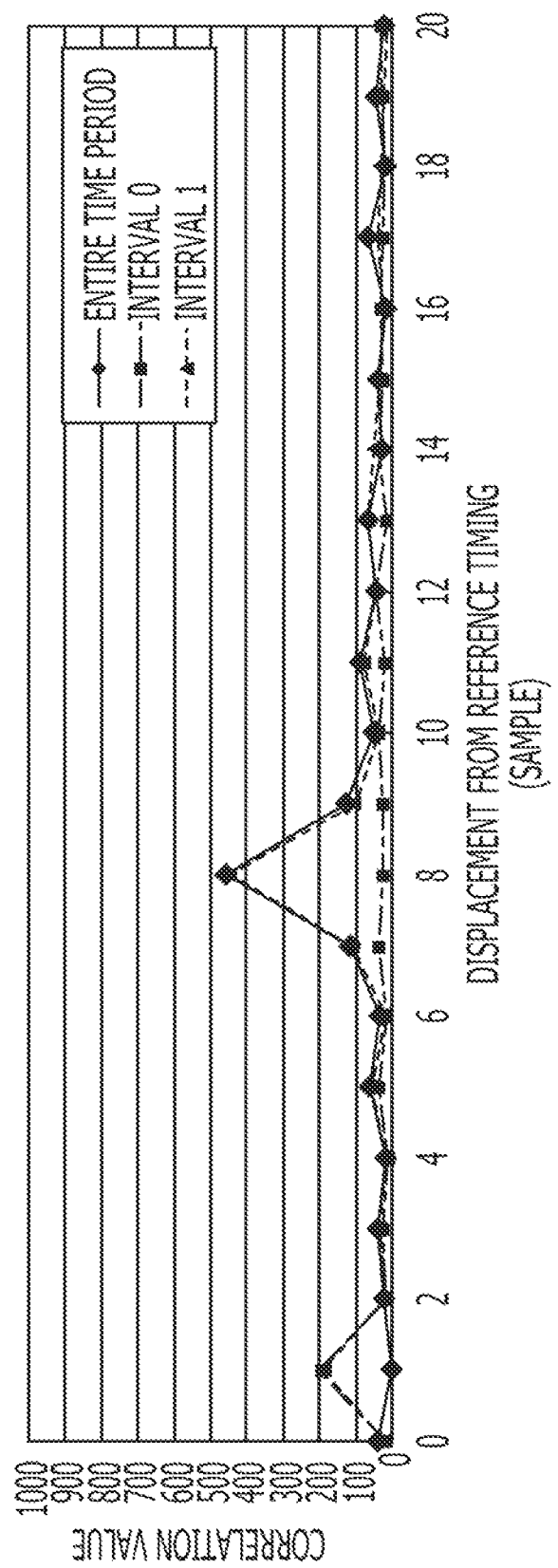
FIG. 12 is a diagram illustrating an example of a correlation value calculation result for a sequence number "3" in an example of incoming timing.

As illustrated in FIGS. 10 to 12, in a case in which the base station 100 calculates correlation values for the "entire time period" of a sequence number, the anterior half interval "interval 0" thereof, and the posterior half interval "interval 1" thereof, since the number of symbols is 839 in a case in which sequence numbers are combined, the maximum value of a correlation value in the "entire time period" reaches 839. On the other hand, since the number of symbols during each of the "interval 0" and the "interval 1" is a half of the number of symbols during the "entire time period", a correlation value in each of the "interval 0" and the "interval 1" is around "420".

As one of these examples, as illustrated in FIG. 10, the peaks of correlation value calculation results for the sequence number "1" of a connection setup request signal occur at a position displaced by 5 samples from reference timing. With respect to the peaks at the position displaced by 5 samples, the correlation value for the "entire time period" and the correlation value for the "interval 0" are around the same value, and the correlation value for the "interval 1" is around "0". Therefore, in the base station 100, it is determined on the basis of the peaks at the position displaced by 5 samples that a level is not low owing to multipath or the like but the sequence number "1" of the connection setup request signal is output only for a half interval.

In addition, as illustrated in FIG. 11, the peaks of correlation value calculation results for the sequence number "2" of a connection setup request signal occur at positions displaced by 5 samples, 8 samples, and 15 samples from the reference timing. With respect to the peaks at the position displaced by 5 samples, the correlation value for the "entire time period" and the correlation value for the "interval 1" are around the same value, and the correlation value for the "interval 0" is around "0". Therefore, in the base station 100, it is determined on the basis of the peaks at the position displaced by 5 samples that a level is not low owing to multipath or the like but the sequence number "2" of the connection setup request signal is output only for a half interval.

In addition, with respect to the peaks at the position displaced by 8 samples, the correlation value for the "entire time period" and the correlation value for the "interval 0" are around the same value, and the correlation value for the "interval 1" is around "0". Therefore, in the base station 100, it is determined on the basis of the peaks at the position displaced by 8 samples that a level is not low owing to multipath or the like but the sequence number "2" of the connection setup request signal is output only for a half interval.

In addition, with respect to the peaks at the position displaced by 15 samples, the correlation value for the "entire time period" is around "843", and the correlation value for the "interval 0" and the correlation value for the "interval 1" are around a half of the maximum value "839". Therefore, in the base station 100, it is determined on the basis of the peaks at the position displaced by 15 samples that the sequence number "2" of the connection setup request signal is output during the entire time period that includes the "interval 0" and the "interval 1".

In addition, as illustrated in FIG. 12, the peaks of correlation value calculation results for the sequence number "3" of a connection setup request signal occur at a position displaced by 8 samples from the reference timing. With respect to the peaks at the position displaced by 8 samples, the correlation value for the "entire time period" and the correlation value for the "interval 1" are around the same value (around a half of the maximum value "839"), and the correlation value for the "interval 0" is around "0". Therefore, in the base station 100, it is determined on the basis of the peaks at the position displaced by 8 samples that a level is not low owing to multipath or the like but the sequence number "3" of the connection setup request signal is output only for a half interval.

Here, an example of the summarization of correlation value calculation results for sequence numbers "1", "2", and "3" in an example of incoming timing will be described with reference to FIG. 13. FIG. 13 is a diagram illustrating the example of the summarization of correlation value calculation results for the sequence numbers "1", "2", and "3" in the example of incoming timing.

For example, as illustrated in FIG. 13, it turns out that the peaks at the position displaced by 5 samples from the reference timing correspond to a UE that makes a connection setup request using a generated-signal sequence generated from the sequence number "1 (anterior half)+2 (posterior half)". In addition, for example, it turns out that the peaks at the position displaced by 8 samples from the reference timing correspond to a UE that makes a connection setup request using a generated-signal sequence generated from the sequence number "2 (anterior half)+3 (posterior half)". In addition, for example, it turns out that the peak at the position displaced by 15 samples from the reference timing corresponds to a UE that makes a connection setup request using a signal sequence that corresponds to the sequence number "2". In other words, even if there is a UE that makes a connection setup request using the same signal sequence, the base station 100 may determine, as described above, that a plurality of UEs make connection setup requests.

(Configuration of Mobile Station According to Second Embodiment)

Figure 14:
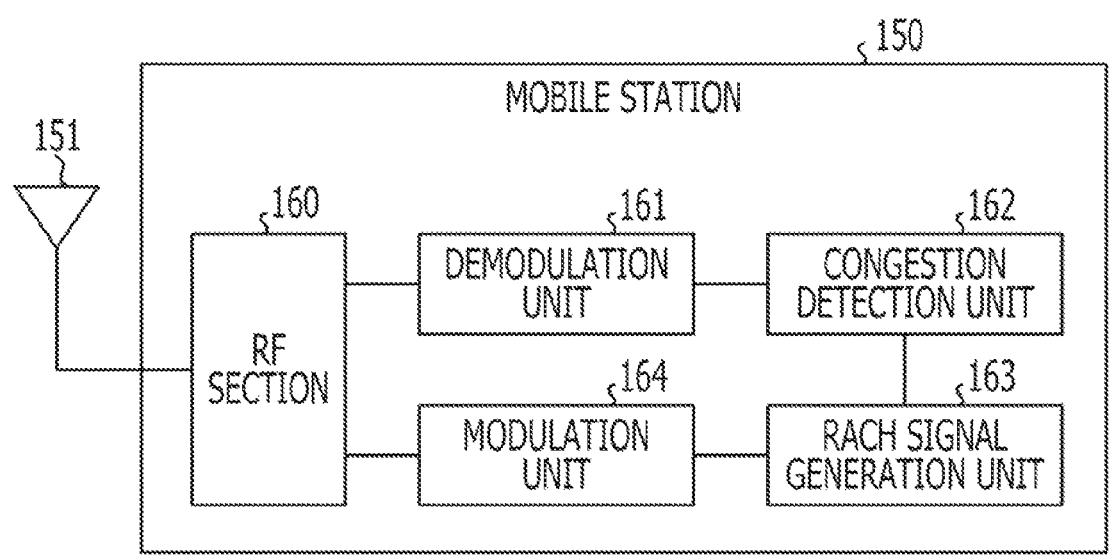
FIG. 14 is a diagram illustrating an example of a configuration of a mobile station according to the second embodiment.

An example of the configuration of a mobile station according to the second embodiment will be described with reference to FIG. 14. FIG. 14 is a diagram illustrating the example of the configuration of the mobile station according to the second embodiment.

For example, as illustrated in FIG. 14, a mobile station 150 includes an antenna 151, an RF section 160, a demodulation unit 161, a congestion detection unit 162, an RACH signal generation unit 163, and a modulation unit 164. In addition, for example, each processing unit is an integrated circuit such as an application specific integrated circuit (ASIC), a field programmable gate array (FPGA), or the like, or an electronic circuit such as a central processing unit (CPU), a micro processing unit (MPU), or the like.

For example, the antenna 151 transmits and receives various kinds of information input to and output from the mobile station 150. As a control operation for data transmission transmitted and received by the mobile station 150, for example, the RF section 160 converts a signal received by the antenna 151 into a baseband signal and converts into a wireless signal the baseband signal output from the modulation unit 164. For example, the demodulation unit 161 demodulates a signal received through the antenna 151 and the RF section 160.

For example, the congestion detection unit 162 detects a congestion state bit ("1 (congestion state)" or "0 (normal state)") that is included in an broadcast signal received from the base station 100 and demodulated by the demodulation unit 161. For example, the RACH signal generation unit 163 generates a connection setup request signal to be transmitted to the base station 100. For example, the modulation unit 164 modulates user data, a pilot signal, and a signal generated by the RACH signal generation unit 163.

For example, in a processing operation performed in the RACH signal generation unit 163, when the congestion state bit is "1 (congestion state)" as a detection result based on the congestion detection unit 162, a connection setup request signal is generated by combining a plurality of connection setup request signals. In addition, for example, the number of connection setup request signals selected for the combination is preliminarily specified by the base station 100.

Figure 15:
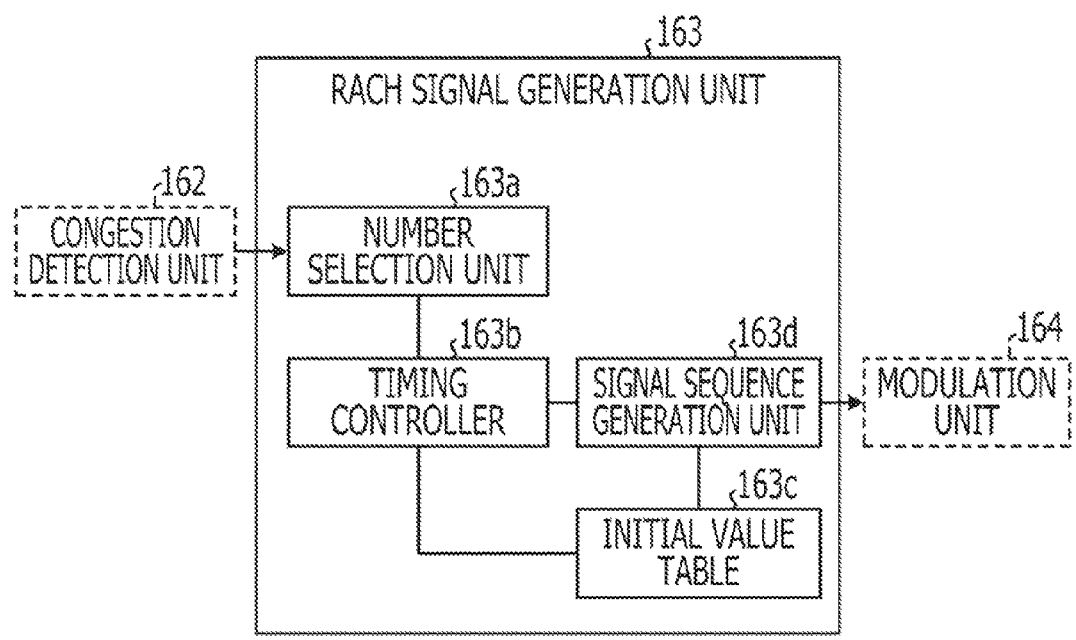
FIG. 15 is a diagram illustrating a detail of an RACH signal generation unit in the mobile station according to the second embodiment.

Next, a detail of the RACH signal reception unit 163 in the mobile station 150 according to the second embodiment will be described with reference to FIG. 15. FIG. 15 is a diagram illustrating the detail of the RACH signal reception unit 163 in the mobile station 150 according to the second embodiment.

For example, as illustrated in FIG. 15, the RACH signal generation unit 163 includes a number selection unit 163a, a timing controller 163b, an initial value table 163c, and a signal sequence generation unit 163d.

For example, the number selection unit 163a selects the sequence number of a connection setup request signal for the base station 100. For example, the timing controller 163b controls times when processing operations performed in the initial value table 163c and the signal sequence generation unit 163d are started. For example, the initial value table 163c assigns an initial] value to the signal sequence generation unit 163d on the basis of a control operation performed in the timing controller 163b. For example, the signal sequence generation unit 163d accepts the initial] value from the initial value table 163c on the basis of a control operation performed in the timing controller 163b, and generates a signal sequence used for a connection setup request.

For example, in the selection of a sequence number performed by the number selection unit 163a, when communication is in a normal state, a sequence number of one connection setup request signal is arbitrarily selected. In addition, for example, in the selection of a sequence number performed by the number selection unit 163a, when communication is in a normal state, sequence numbers the number of which is N are arbitrarily selected or selected on the basis of a given rule, on the basis of the selection number N that the base station 100 preliminarily gives notice of. Specifically, when N=2, the number selection unit 163a obtains sequence numbers of the anterior half portion and the posterior half portion of a connection setup request signal on the basis of (x+32) mod 64 (the anterior half portion: an arbitrary sequence number x; the posterior half portion: (x+32) mod 64).

In detail, when a connection setup request for a normal call is made on the condition that the congestion state bit is "1 (congestion state)", the number selection unit 163 selects sequence numbers the number of which corresponds to the selection number N that the base station 100 preliminarily gives notice of, and outputs the selected sequence numbers to the timing controller 163b. At this time, if the signal sequence length of the connection setup request signal is L, a sequence number varies in units of L/N. Accordingly, the timing controller 163b controls the initial value table 163c and the switching timing of a sequence number so that the signal sequence matches the following signal sequence:

First: $z_1(0), z_1(1), \ldots, z_1(L/N-1)$
Second: $z_2(L/N), z_2(L/N+1), \ldots, z_2(L/N*2-1)$
Nth: $z_n((L/N)*(N-1)), z_n((L/N)*(N-1)+1), \ldots, z_n(L)$ Here, $z_1$, $z_2$, and $z_n$ indicate signal sequences that correspond to sequence numbers different from one another, respectively.

Accordingly, for example, the initial value table 163c sets values that start with $z_i(L/N)$ to the second signal sequence, and outputs the values to the signal sequence generation unit 163d in response to the switching timing from the timing controller 163b. In addition, the initial value table 163c may preliminarily set values necessary for individual signal sequences, and output a corresponding initial value to the signal sequence generation unit 163d in response to the switching timing from the timing controller 163b.

(Processing Operation Performed in Congestion State According to Second Embodiment)

Figure 16:
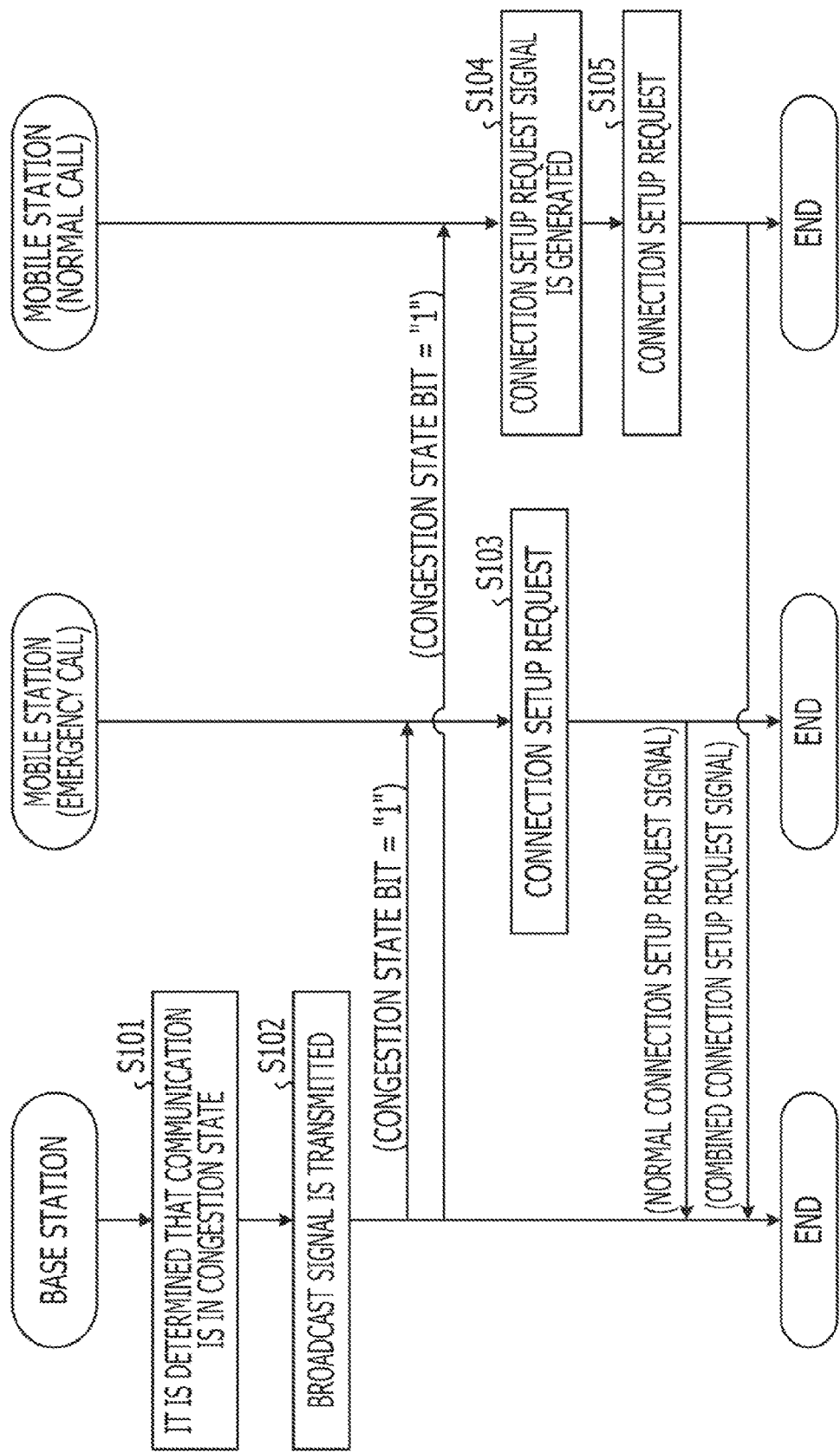
FIG. 16 is a flowchart illustrating a flow of a processing operation performed in a congestion state by the wireless communication system according to the second embodiment.
Figure 17:
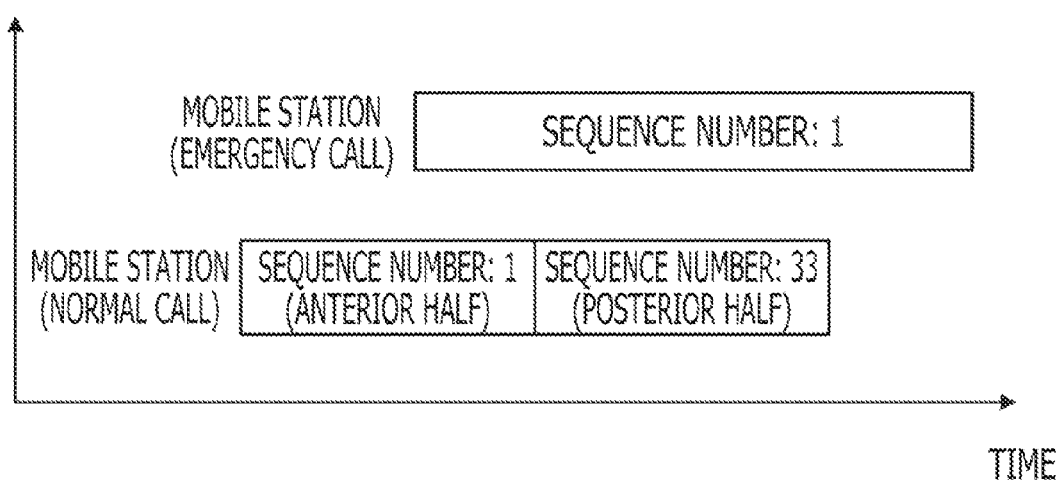
FIG. 17 is a diagram illustrating an example of a sequence number used in an example of a processing operation performed in a congestion state by the wireless communication system.

A flow of a processing operation performed in a congestion state by the wireless communication system according to the second embodiment will be described with reference to FIG. 16. FIG. 16 is a flowchart illustrating the flow of the processing operation performed in the congestion state by the wireless communication system according to the second embodiment. In addition, an example of a sequence number used in an example of the processing operation performed in the congestion state by the wireless communication system will be described with reference to FIG. 17. FIG. 17 is a diagram illustrating the example of the sequence number used in the example of the processing operation performed in the congestion state by the wireless communication system. In addition, in FIG. 16, a case will be described in which the wireless communication system includes a base station 100, a mobile station (mobile station that makes an emergency call), and a mobile station (mobile station that makes a normal call).

For example, as illustrated in FIG. 16, on the basis that the number of requests of all connection setup request signals from individual mobile stations is large, the base station 100 determines that communication is in a congestion state (Step S101). In addition, the base station 100 notifies the mobile station (mobile station that makes an emergency call) and the mobile station (mobile station that makes a normal call) of an broadcast signal that includes a congestion state bit "1 (congestion state)" (Step S102).

On the other hand, the mobile station (mobile station that makes an emergency call) that receives the broadcast signal from the base station 100 makes a connection setup request to the base station 100 using a signal sequence that corresponds to an arbitrary sequence number "1" (refer to FIG. 17) used when communication is in a normal state (Step S103). In addition, for example, the mobile station (mobile station that makes a normal call) that receives the broadcast signal from the base station 100 generates a generated-signal sequence from "1 (anterior half)+33 (posterior half)" that is the combination of sequence numbers of connection setup request signals used in the normal state (Step S104). In addition, the mobile station (mobile station that makes a normal call) makes a connection setup request to the base station 100 using the generated generated-signal sequence (Step S105). In addition, the processing order of a connection setup request (Step S103 and Step S105) made by each mobile station may be changed in accordance with a distance from the base station 100 and a communication situation.

(Processing Operation Performed in Normal State According to Second Embodiment)

Figure 18:
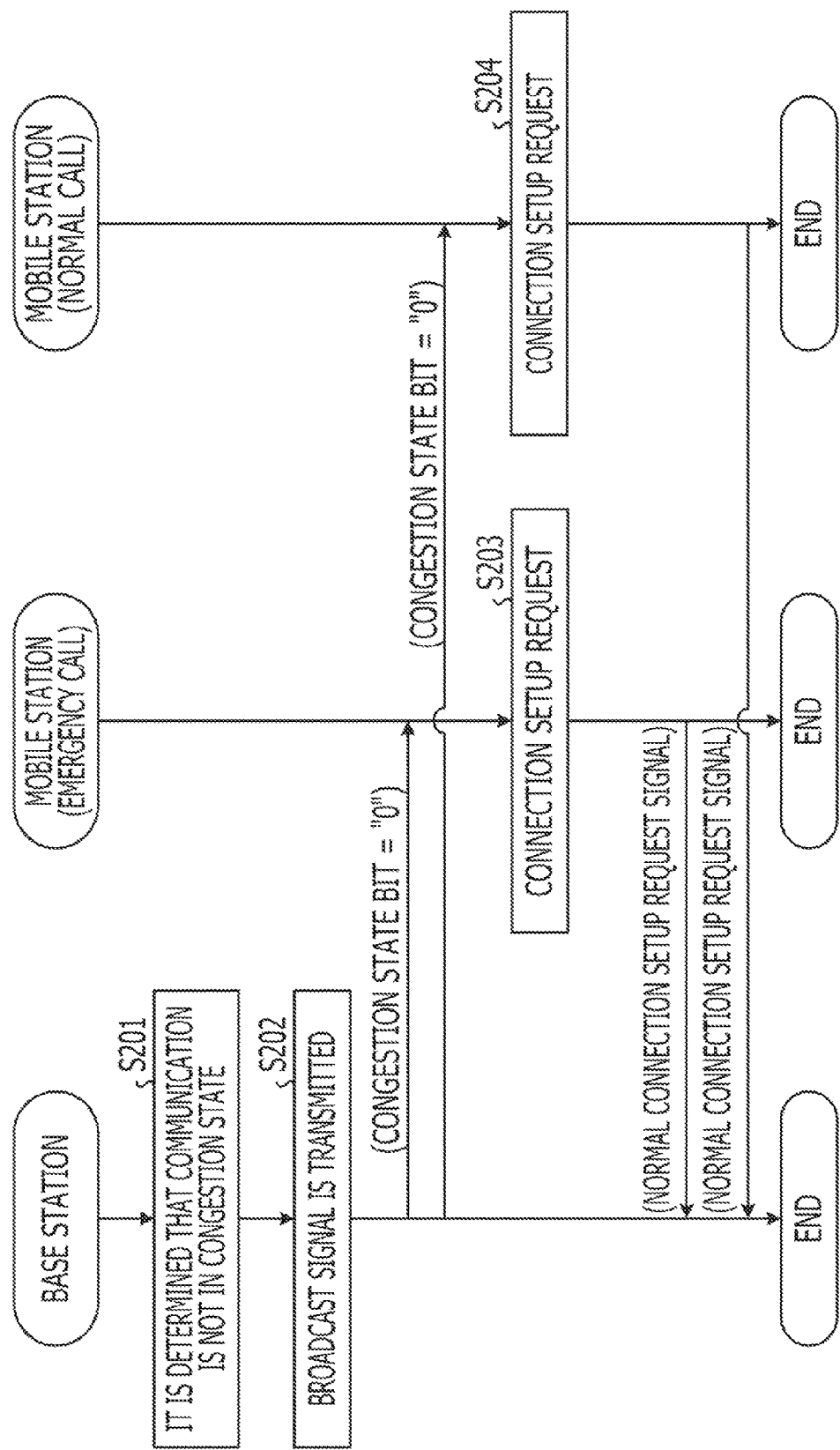
FIG. 18 is a flowchart illustrating a flow of a processing operation performed in a normal state by the wireless communication system according to the second embodiment.

A flow of a processing operation performed in a normal state by the wireless communication system according to the second embodiment will be described with reference to FIG. 18. FIG. 18 is a flowchart illustrating the flow of the processing operation performed in the normal state by the wireless communication system according to the second embodiment. In addition, in FIG. 18, a case will be described in which the wireless communication system includes a base station 100, a mobile station (mobile station that makes an emergency call), and a mobile station (mobile station that makes a normal call).

For example, as illustrated in FIG. 18, on the basis of the number of requests of all connection setup requests from individual mobile stations or the like, the base station 100 determines that communication is in a normal state (Step S201). In addition, the base station 100 notifies the mobile station (mobile station that makes an emergency call) and the mobile station (mobile station that makes a normal call) of an broadcast signal that includes a congestion state bit "0 (normal state)" (Step S202).

On the other hand, the mobile station (mobile station that makes an emergency call) that receives the broadcast signal from the base station 100 makes a connection setup request to the base station 100 using a signal sequence that corresponds to an arbitrary sequence number "1" used when communication is in the normal state (Step S203). On the other hand, the mobile station (mobile station that makes a normal call) that receives the broadcast signal from the base station 100 makes a connection setup request to the base station 100 using a signal sequence that corresponds to an arbitrary sequence number "2" used when communication is in the normal state (Step S204). In addition, the processing order of a connection setup request (Step S203 and Step S204) made by each mobile station may be changed in accordance with a distance from the base station 100 and a communication situation.

According to the second embodiment, when, on the basis of the notification from the base station 100, detecting that communication is in the congestion state, the mobile station makes a connection setup request for an emergency call using a signal sequence that corresponds to a sequence number of a connection setup request signal used when the communication is in the normal state. In addition, when, on the basis of the notification from the base station 100, detecting that communication is in the congestion state, the mobile station makes a connection setup request for a normal call using a generated-signal sequence generated by combining sequence numbers of connection setup request signals used when communication is in the normal state. As these results, the mobile station may suppress the deterioration of connection for a connection setup request.

Third Embodiment

In the second embodiment, the case has been described in which, when communication is in the congestion state, for an emergency call, a signal sequence is used that corresponds to a sequence number of a connection setup request signal used when communication is in the normal state, and for a normal call, a generated-signal sequence is used that is generated by combining sequence numbers of connection setup request signals used when communication is in the normal state. Hereinafter, a case will be described in which, when communication is in the congestion state, for an emergency call, a generated-signal sequence is used that is generated by combining sequence numbers of connection setup request signals used when communication is in the normal state, and for a normal call, a signal sequence is used that corresponds to a sequence number of a connection setup request signal used when communication is in the normal state.

Here, since the configurations of the base station and the mobile stations in the congestion state according to the third embodiment are substantially the same as those in the second embodiment, and the operations thereof only differ from the second embodiment in that a generated-signal sequence is used for an emergency call of a mobile station, the descriptions thereof will be omitted by using the same reference numerals. In addition, since the processing flows of the base station and the mobile stations in the normal state according to the third embodiment are substantially the same as those in the second embodiment, the descriptions thereof will be omitted.

(System Configuration in Congestion State According to Third Embodiment)

Figure 19:
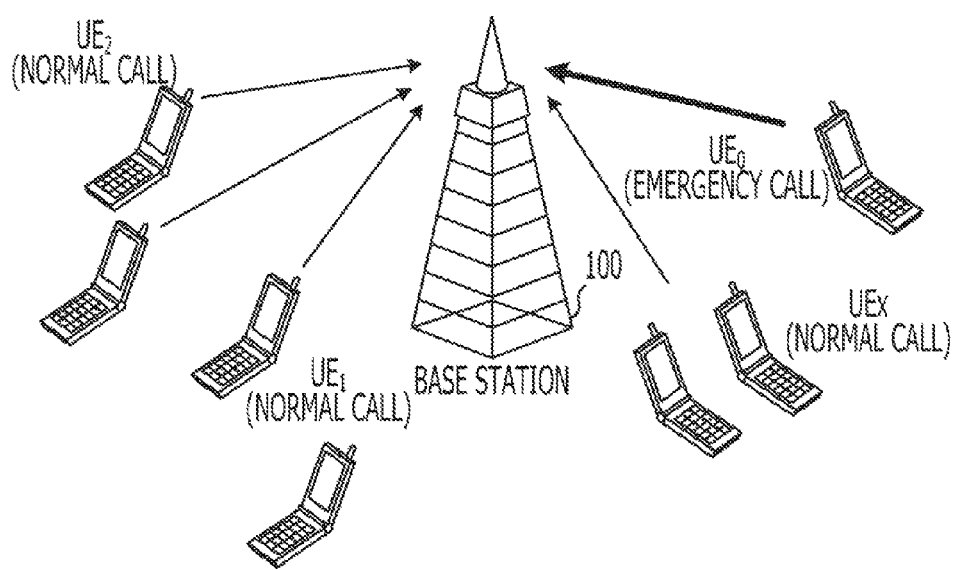
FIG. 19 is a diagram illustrating an example of a configuration of a wireless communication system that includes a mobile station in a congestion state according to a third embodiment.

An example of the configuration of a wireless communication system that includes a mobile station in a congestion state according to a third embodiment. FIG. 19 is a diagram illustrating the example of the configuration of the wireless communication system that includes the mobile station in the congestion state according to the third embodiment. In addition, the mobile station is indicated as a UE ($UE_0$, $UE_1$, $UE_2$, and $UE_x$) in FIG. 19. Hereinafter, in the same way as in the second embodiment, as an example of the mobile station, a case will be described in which 64 sequence numbers are used in LTE, and the mobile station makes a connection setup request necessary for initial access.

For example, as illustrated in FIG. 19, the wireless communication system includes a base station 100, a $UE_0$ as a mobile station (mobile station that makes an emergency call), a $UE_1$ as a mobile station (mobile station that makes a normal call), a $UE_2$ as a mobile station (mobile station that makes a normal call), and a $UE_x$ as a mobile station (mobile station that makes a normal call). In such a configuration as described above, for example, the base station 100 performs a statistical processing operation for a connection setup request signal, in which the number of requests of all connection setup request signals based on individual mobile station in the coverage area of the base station 100 itself is taken into account.

In addition, when it is determined that congestion state occurs, the base station 100 sets "1 (congestion state)" to a congestion state bit included in an broadcast signal, and notifies all mobile stations of the broadcast signal. In addition, individual mobile stations detect it from the congestion state bit included in the broadcast signal that the base station 100 gives notice of that communication is in the congestion state.

On the other hand, for example, in a case in which initial access is performed in the congestion state, the mobile station that makes an emergency call makes a connection setup request to the base station 100 using a generated-signal sequence generated from the combination of sequence numbers of connection setup request signals used when communication is in the normal state, thereby connecting to the base station 100. In addition, for example, in a case in which initial access is performed in the congestion state, the mobile station that makes a normal call makes a connection setup request to the base station 100 using a signal sequence that corresponds to a sequence number randomly selected from among 64 sequence numbers, thereby connecting to the base station 100.

Figure 20:
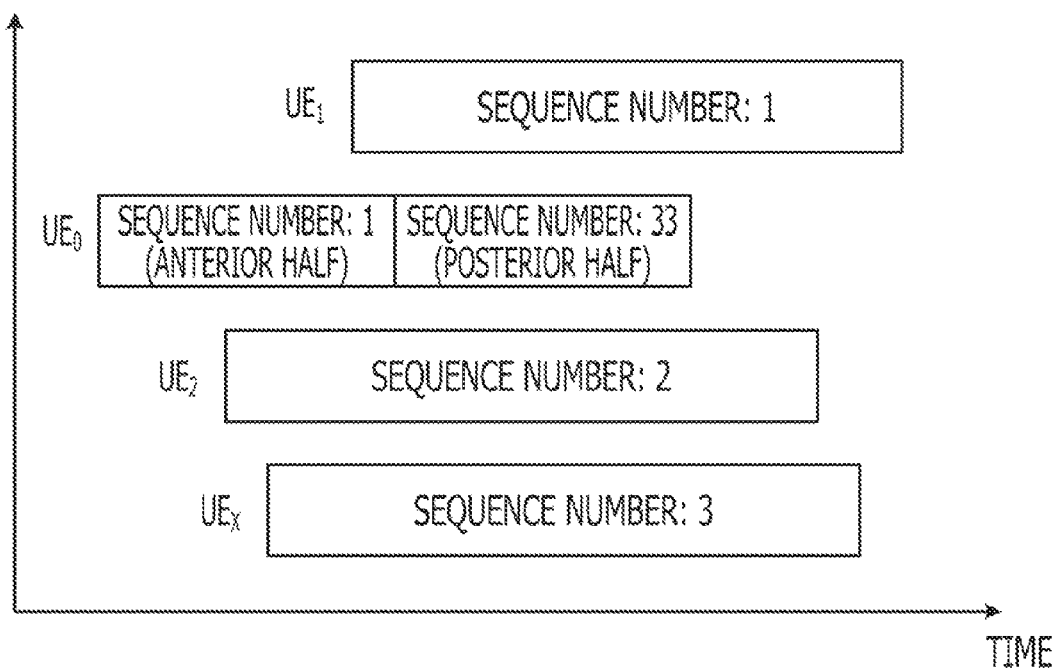
FIG. 20 is a diagram illustrating a usage example of a sequence number used by a mobile station in a congestion state according to the third embodiment.

Here, a usage example of a sequence number used by the mobile station in the congestion state according to the third embodiment will be described with reference to FIG. 20. FIG. 20 is a diagram illustrating the usage example of the sequence number used by the mobile station in the congestion state according to the third embodiment. In addition, in FIG. 20, a horizontal axis indicates time. In addition, each of the UEs outputs through a time period indicated in FIG. 20 a signal sequence that corresponds to each of sequence numbers.

For example, as illustrated in FIG. 20, in such a configuration as illustrated in FIG. 19, the $UE_0$ generates a signal sequence (generated-signal sequence) from "1 (anterior half)+33 (posterior half)" that is the combination of a sequence number "1" and a sequence number "33" of connection setup request signals used when communication is in the normal state. In addition, the $UE_0$ makes a connection setup request (emergency call) to the base station 100 using the generated generated-signal sequence. In addition, for example, in such a configuration as illustrated in FIG. 19, the $UE_1$ randomly selects a sequence number "1" of a connection setup request signal used when communication is in the normal state, and makes a connection setup request (normal call) to the base station 100 using a signal sequence that corresponds to the selected sequence number, thereby connecting to the base station 100.

In addition, for example, in such a configuration as illustrated in FIG. 19, the $UE_2$ randomly selects a sequence number "2" of a connection setup request signal used when communication is in the normal state, and makes a connection setup request (normal call) to the base station 100 using a signal sequence that corresponds to the selected sequence number, thereby connecting to the base station 100. In addition, for example, in such a configuration as illustrated in FIG. 19, the $UE_x$ randomly selects a sequence number "3" of a connection setup request signal used when communication is in the normal state, and makes a connection setup request (normal call) to the base station 100 using a signal sequence that corresponds to the selected sequence number, thereby connecting to the base station 100.

In the same way as in the second embodiment, the generated-signal sequence is generated by combining sequence numbers of connection setup request signals used when communication is in the normal state. As an example of a combination method for a sequence number, there is a method in which the combination of sequence numbers is obtained on the basis of (x+32) mod 64 (x: a sequence number used when communication is in the normal state). For example, when a sequence number used when communication is in the normal state is "1", a sequence number "33" is obtained. Therefore, a sequence number is obtained as "1 (anterior half)+33 (posterior half)".

According to the third embodiment, as described above, when, on the basis of the notification from the base station 100, detecting that communication is in the congestion state, the mobile station makes a connection setup request for a normal call using a signal sequence that corresponds to a sequence number of a connection setup request signal used when the communication is in a normal state. In addition, when, on the basis of the notification from the base station 100, detecting that communication is in the congestion state, the mobile station makes a connection setup request for an emergency call using a generated-signal sequence generated by combining sequence numbers of connection setup request signals used when communication is in the normal state. As these results, the mobile station may suppress the deterioration of connection for a connection setup request.

Fourth Embodiment

Incidentally, while, in the first to third embodiments, a case has been described in which a signal sequence that corresponds to a sequence number of a connection setup request signal is generated during all intervals of a time period necessary for a connection setup request, the signal sequence may be intermittently generated during some of all intervals. Accordingly, a case will be described hereinafter in which a connection setup request is made using a generated-signal sequence intermittently generated during some of all intervals of the time period necessary for the connection setup request.

(Configuration of Base Station According to Fourth Embodiment)

Figure 21:
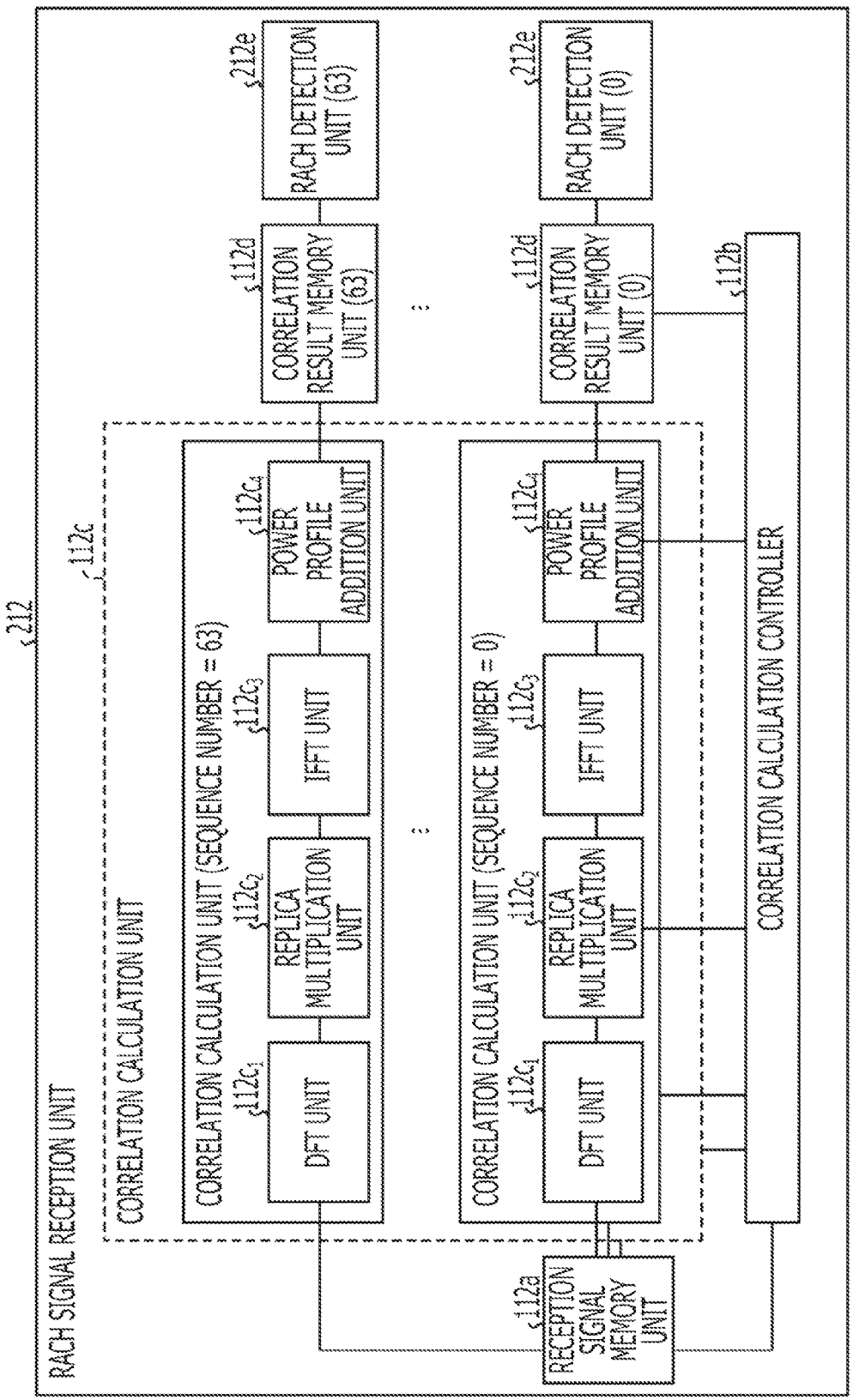
FIG. 21 is a diagram illustrating a detail of an RACH signal reception unit in a base station according to a fourth embodiment.

A detail of an RACH signal reception unit in a base station according to a fourth embodiment will be described with reference to FIG. 21. FIG. 21 is a diagram illustrating the detail of the RACH signal reception unit in the base station according to the fourth embodiment. In addition, since the configuration of the base station according to the fourth embodiment is the same as that in the second embodiment, the description thereof will be omitted by using the same reference numerals, and the configuration of an RACH signal reception unit 212 different from that in the second embodiment will be described. In addition, in FIG. 21, the same symbols are assigned to the same configuration elements as those in the RACH signal reception unit 112, and the descriptions of the same processing operations as those performed in the RACH signal reception unit 112 according to the second embodiment will be omitted.

For example, as illustrated in FIG. 21, the RACH signal reception unit 112 includes a reception signal memory unit 112a, a correlation calculation controller 112b, a correlation calculation unit 112c, a correlation result memory unit 112d, and an RACH detection unit 212e. In addition, for example, as illustrated in FIG. 21, the correlation calculation unit 112c includes a DFT unit 112c1, a Replica multiplication unit 112c2, an IFFT unit 112c3, and a power profile addition unit 112c4.

For example, as one of these configuration elements, on the basis of information of the addition results stored by the correlation result memory unit 112d, the RACH detection unit 112e performs power detection, path detection, the calculation of a timing displacement (timing advance), and the detection of the combination of connection setup request signals. As illustrated in FIG. 21, a processing operation based on the RACH detection unit 212e is performed on each correlation result memory unit 112d that stores a correlation result for each sequence number.

Figure 22:
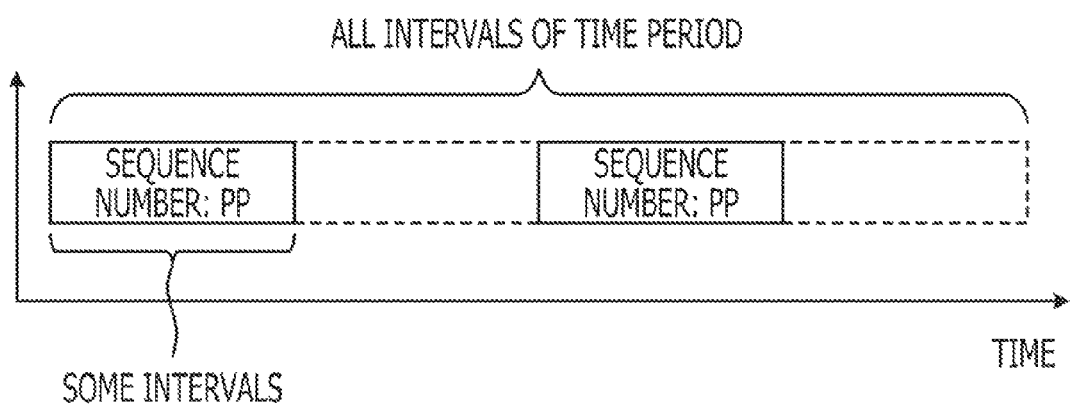
FIG. 22 is a diagram illustrating a usage example of a sequence number used by a mobile station according to the fourth embodiment.

Here, a usage example of a sequence number used by a mobile station according to the fourth embodiment will be described with reference to FIG. 22. FIG. 22 is a diagram illustrating the usage example of the sequence number used by the mobile station according to the fourth embodiment.

For example, as illustrated in FIG. 22, the mobile station makes a connection setup request using a signal sequence "PP" that intermittently occurs during some of all intervals of the time period necessary for the connection setup request. For example, the all interval means an interval during which, in the second embodiment, an emergency call makes a connection setup request using a signal sequence that corresponds to the sequence number "1", or a normal call makes a connection setup request using a generated-signal sequence that corresponds to the sequence number "1 (anterior half)+ 33 (posterior half)". In the example illustrated in FIG. 22, an example is illustrated in which a transmission interval of a connection setup request signal made to the base station 100 is divided in quarters. In addition, the number of division is not limited to four.

In addition, for example, the mobile station makes a connection setup request for one of a normal call and an emergency call using a signal sequence that corresponds to a sequence number intermittently generated. In other words, since making a connection setup request using a signal sequence that corresponds to a sequence number intermittently generated, the mobile station may effectively use sequence numbers as resources.

Figure 23:
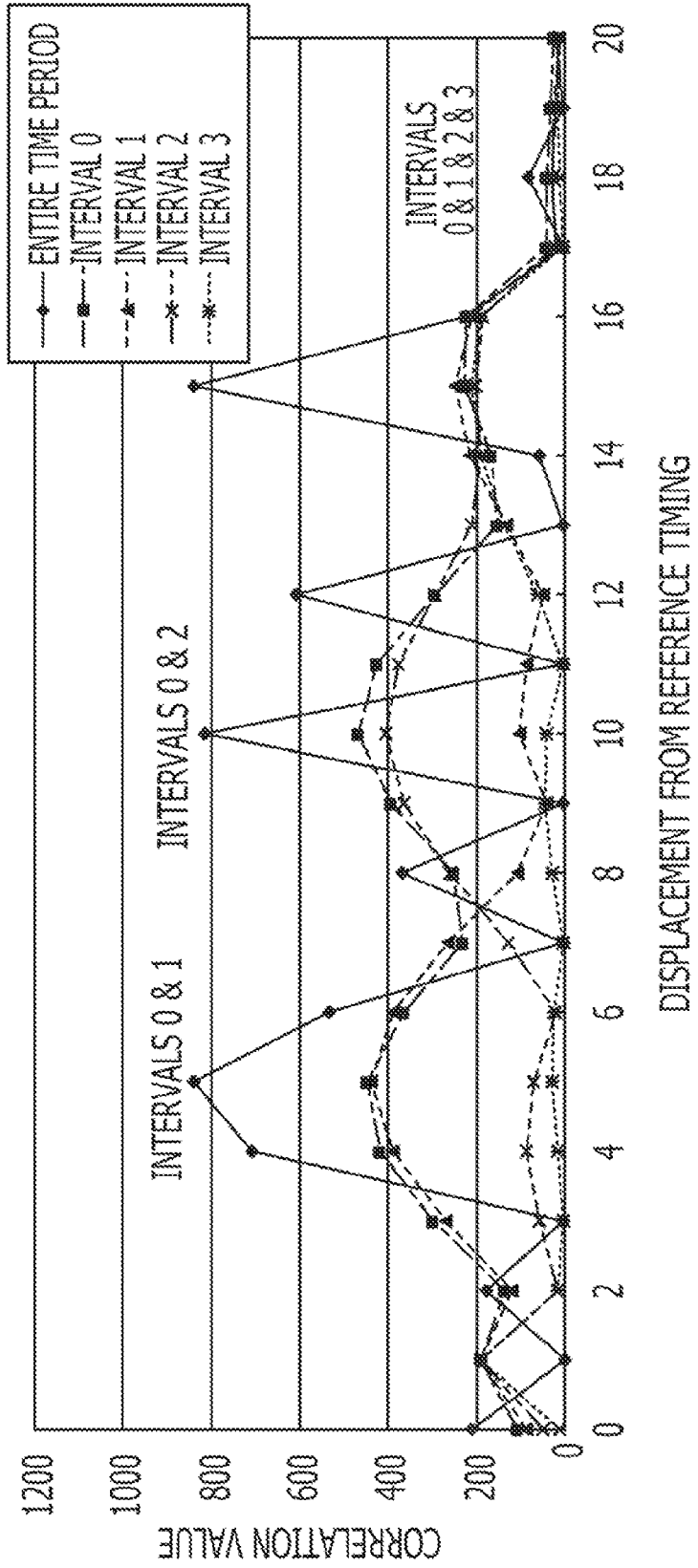
FIG. 23 is a diagram illustrating an example of a correlation value calculation result in an example, in which a transmission interval is divided in quarters, according to the fourth embodiment.

Next, an example of a correlation value calculation result in an example, in which the transmission interval is divided in quarters, according to the fourth embodiment will be described with reference to FIG. 23. FIG. 23 is a diagram illustrating the example of the correlation value calculation result in the example, in which the transmission interval is divided in quarters, according to the fourth embodiment. In addition, In FIG. 23, intervals into which the transmission interval is divided are indicated as an "interval 0", an "interval 1", an "interval 2", and an "interval 3", respectively.

For example, as illustrated in FIG. 23, when the base station 100 calculates individual correlation values for the "entire time period" of a sequence number, the "interval 0", the "interval 1", the "interval 2", and the "interval 3", the maximum value of a correlation value in the "entire time period" reaches 839. In addition, the maximum value of a correlation value in each of the intervals into which the transmission interval is divided differs depending on the number of intervals during which transmission is performed.

In addition, the peaks of correlation value calculation results illustrated in FIG. 23 occur at positions displaced by 5 samples, 10 samples, and 15 samples from reference timing. The base station 100 determines on the basis of the correlation value calculation results whether or not there are a plurality of mobile stations. A detail of the determination will be described later.

Here, an example of a relationship between the maximum values of correlation values based on the number of intervals in an example, in which a transmission interval is divided in quarters, according to the fourth embodiment will be described with reference to FIG. 24. FIG. 24 is a diagram illustrating an example of a relationship between the maximum values of correlation values based on the number of intervals in an example, in which a transmission interval is divided in quarters, according to the fourth embodiment.

For example, as illustrated in FIG. 24, since the amplitude of an output from the mobile station that transmits a signal using four intervals that correspond to the entire transmission interval is A, the maximum value of the correlation value in each of the intervals becomes $(839/4)*(1)=209$. In addition, for example, since the amplitude of an output from the mobile station that transmits a signal using three intervals in the transmission interval is $(4/3)*A$, the maximum value of the correlation value in each of the intervals becomes $(839/4)*(4/3) =279$.

In addition, for example, since the amplitude of an output from the mobile station that transmits a signal using two intervals in the transmission interval is $2*A$, the maximum value of the correlation value in each of the intervals becomes $(839/4)*(2)=419$. In addition, for example, since the amplitude of an output from the mobile station that transmits a signal using one interval in the transmission interval is $4*A$, the maximum value of the correlation value in the interval becomes $(839/4)*(4)=839$.

In short, since the mobile station adjusts the amplitude of the output thereof so that total electric power used during the transmission interval is the same, the addition of correlation results in the individual intervals turns out to be around "839" that corresponds to the correlation result in the entire transmission interval. Accordingly, on the basis of the correlation result in the entire transmission interval that is not divided, the base station 100 determines at which timing a peak exists.

Specifically, with respect to a correlation result at the position displaced by 5 samples in FIG. 23, the correlation values of the "interval 0" and the "interval 1" are around "419", and the correlation value of the "entire time period" is around "839". In addition, with respect to a correlation result at the position displaced by 5 samples, the correlation values of the "interval 2" and the "interval 3" are around "0". Therefore, the base station 100 determines on the basis of the correlation result at the position displaced by 5 samples from the reference timing that a corresponding mobile station transmits a signal during the "interval 0" and the "interval 1".

In addition, with respect to a correlation result at the position displaced by 10 samples in FIG. 23, the correlation values of the "interval 0" and the "interval 2" are around "419", and the correlation value of the "entire time period" is around "839". In addition, with respect to a correlation result at the position displaced by 10 samples, the correlation values of the "interval 1" and the "interval 3" are around "0". Therefore, the base station 100 determines on the basis of the correlation result at the position displaced by 10 samples from the reference timing that a corresponding mobile station transmits a signal during the "interval 0" and the "interval 2".

In addition, with respect to a correlation result at the position displaced by 15 samples in FIG. 23, the correlation values of the "interval 0", the "interval 1", the "interval 2", and the "interval 3" are around "209", and the correlation value of the "entire time period" is around "839". Therefore, the base station 100 determines on the basis of the correlation result at the position displaced by 15 samples from the reference timing that a corresponding mobile station transmits a signal during all intervals including the "interval 0", the "interval 1", the "interval 2", and the "interval 3".

Here, an example of a transmission pattern at each peak in an example, in which the transmission interval is divided in quarters, according to the fourth embodiment will be described with reference to FIG. 25. FIG. 25 is a diagram illustrating the example of the transmission pattern at each peak in the example, in which the transmission interval is divided in quarters, according to the fourth embodiment.

For example, as illustrated in FIG. 25, a peak at the position displaced by 5 samples corresponds to a mobile station that transmits a signal using the "interval 0" and the "interval 1", and a peak at the position displaced by 10 samples corresponds to a mobile station that transmits a signal using the "interval 0" and the "interval 2". In addition, for example, a peak at the position displaced by 15 samples corresponds to a mobile station that transmits a signal using the entire transmission interval. Accordingly, since transmission patterns correspond to signals transmitted from mobile stations different from one another, the base station 100 determines that the number of mobile stations that use a signal sequence corresponding to the same sequence number (for example, sequence number: xx) is "3". In other words, even in a case in which signals are transmitted using a signal sequence that corresponds to the same sequence number, since the transmission patterns are different from one another with respect to the mobile stations, the base station 100 may determine the number of mobile stations in each transmission interval.

Next, a correlation result for a sequence number xx in an example, in which a transmission interval is divided in quarters, according to the fourth embodiment will be described with reference to FIGS. 26 and 27.

FIG. 26 is a diagram illustrating an example of a correlation result for the sequence number xx=0 in the example, in which the transmission interval is divided in quarters, according to the fourth embodiment. FIG. 27 is a diagram illustrating an example of a correlation result for the sequence number xx=1 in the example, in which a transmission interval is divided in quarters, according to the fourth embodiment. In addition, hereinafter, the correlation result will be described along with processing operations performed in configuration elements of the RACH signal reception unit 212 illustrated in FIG. 21.

For example, the reception signal memory unit 112*a* stores a received connection setup request signal in a memory, and outputs the received connection setup request signal to the correlation calculation unit 112*c*. The reception data stored in the memory by the reception signal memory unit 112*a* is used for calculating a correlation value for each interval. In addition, with respect to storage timing when the reception signal memory unit 112*a* stores the reception data in the memory, a processing operation for correlation calculation for the entire time period and the individual intervals may be performed after the reception signal is stored in the memory.

For example, the correlation calculation controller 112*b* notifies the reception signal memory unit 112*a*, the correlation calculation unit 112*c*, and the correlation result memory unit 112*d* of information used for calculating a correlation value for the entire time period. For example, the correlation calculation unit 112*c* generates, over an entire connection setup request signal, a signal that corresponds to a sequence number xx of the connection setup request signal, multiplies a preliminarily stored connection setup request signal sequence by a signal converted onto a frequency axis, and converts the multiplied signal onto a time axis, thereby calculating a power profile. In addition, the calculation result of the power profile by the correlation calculation unit 112*c* is output to the correlation result memory unit 112*d*.

For example, the correlation result memory unit 112*d* stores a correlation result for the entire time period in a memory, and outputs the stored correlation result to the RACH detection unit 212*e*. In addition, the correlation result memory unit 112*d* stores the correlation result for the entire time period and correlation values for individual intervals in the memory in units of detected peaks (refer to FIG. 26).

FIG. 26 illustrates a correlation result for the sequence number xx=0. For example, at a peak at the position displaced by 5 samples, it turns out that "interval 0: 419", "interval 1: 419", "interval 2: 68", and "interval 3: 28". In addition, for example, at a peak at the position displaced by 10 samples, it turns out that "interval 0: 419", "interval 1: 102", "interval 2: 419", and "interval 3: 39". In addition, for example, at a peak at the position displaced by 15 samples, it turns out that "interval 0: 209", "interval 1: 209", "interval 2: 209", and "interval 3: 209". In addition, for example, when there is no peak for the sequence number xx=1, there is no correlation result as illustrated in FIG. 27.

For example, the RACH detection unit 212*e* determines on the basis of the correlation result for the entire time period whether or not there is a peak greater than or equal to a given threshold value, and notifies the correlation calculation controller 112*b* of the determination result. In this regard, however, when there is no peak, it is not necessary to detect correlation for each interval. Therefore, the RACH detection unit 212*e* notifies the correlation calculation controller 112*b* that there is no peak. Accordingly, the correlation calculation controller 112*b* performs a control operation so that correlation values for individual intervals of a corresponding sequence number are not calculated. In addition, when the RACH detection unit 212*e* notifies the correlation calculation controller 112*b* that there in a peak, the correlation calculation controller 112*b* performs a control operation so that correlation values for individual intervals of a corresponding sequence number is calculated.

For example, the correlation calculation controller 112*b* controls the reception signal memory unit 112*a*, the correlation calculation unit 112*c*, and the correlation result memory unit 112*d* so that correlation values for the "interval 0", the "interval 1", the "interval 2", and the "interval 3" are calculated in the order thereof. In addition, with respect to the control of the calculation order of the correlation values, performed by the correlation calculation controller 112*b*, the calculation may be performed in any order.

For example, the correlation calculation unit 112*c* generates a connection setup request signal in an interval corresponding to a sequence number xx that the correlation calculation controller 112*b* gives notice of, and multiplies a connection setup request signal sequence, which is input from the reception signal memory unit 112*a* and preliminarily stored, by a signal converted onto the frequency axis. In addition, for example, the correlation calculation unit 112*c* converts the multiplied signal onto the time axis to calculate a power profile, and outputs the calculation result to the memory unit 112*d*. In addition, the processing operation mentioned above is performed for each interval.

In addition, for example, the correlation calculation controller 112*b* notifies the RACH detection unit 212*e* of the completion of the calculation of all correlation values. For example, on the basis of the result information of correlation calculation for the entire time period and the individual intervals, the RACH detection unit 212*e* outputs the number of mobile stations that uses a signal sequence corresponding to a sequence number xx of a connection setup request signal, a transmission pattern, displacement from the reference timing, and a peak detection result to the RACH signal controller 116.

As described above, since the mobile station makes a connection setup request using a signal sequence that intermittently occurs during some of all intervals for the signal sequence, sequence numbers as limited resources may be effectively used.

Fifth Embodiment

While the embodiment of the mobile station, the base station, and the wireless communication method, disclosed in the present application, has been described, the mobile station, the base station, and the wireless communication method may be implemented in various kinds of forms different from one another other than the embodiment described above. Accordingly, different embodiments will be described with respect to two items (1) sequence number is fixed and (2) configurations of individual devices.

(1) Sequence Number is Fixed

While, in the embodiments described above, the case has been described in which a connection setup request is made using a signal sequence that corresponds to a sequence number used when communication is in the normal state, one of a sequence number used for an emergency call and a sequence number used for a normal call may be fixed. Consequently, hereinafter, a case in which one of a sequence number used for an emergency call and a sequence number used for a normal call is fixed will be described with reference to FIGS. 28 and 29.

Figure 28:
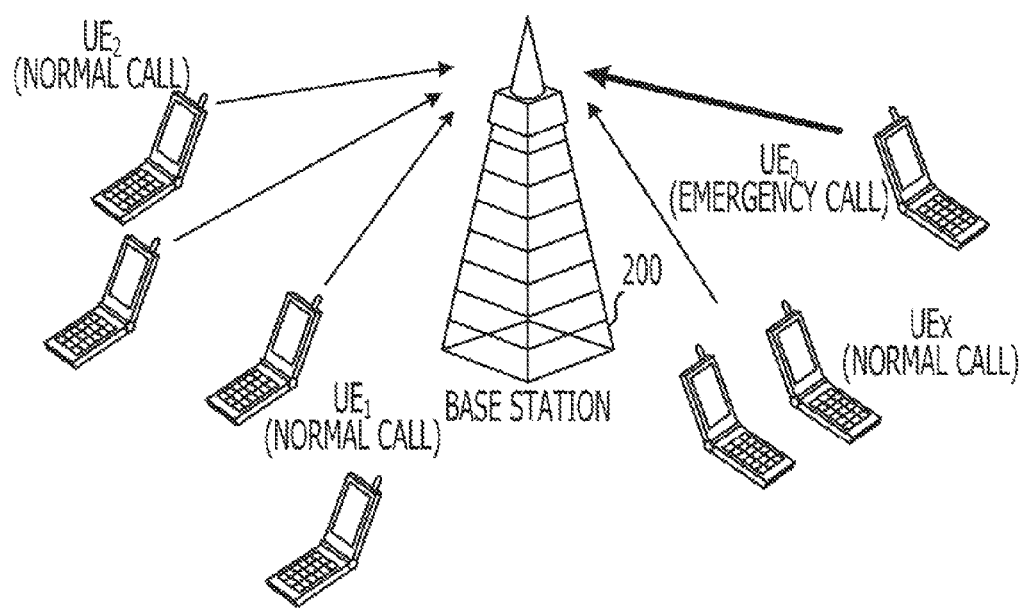
FIG. 28 is a diagram illustrating an example of a configuration of a wireless communication system that includes a mobile station in which a sequence number is fixed according to a fifth embodiment.

First, an example of the configuration of a wireless communication system that includes a mobile station in which a sequence number is fixed according to a fifth embodiment will be described with reference to FIG. 28. FIG. 28 is a diagram illustrating the example of the configuration of the wireless communication system that includes the mobile station in which the sequence number is fixed according to the fifth embodiment.

For example, as illustrated in FIG. 28, the wireless communication system includes a base station 200, a $UE_0$ as a mobile station (mobile station that makes an emergency call), a $UE_1$ as a mobile station (mobile station that makes a normal call), a $UE_2$ as a mobile station (mobile station that makes a normal call), and a $UE_x$ as a mobile station (mobile station that makes a normal call). In such a configuration as described above, for example, the base station 200 performs a statistical processing operation for a connection setup request signal, in which the number of requests of all connection setup request signals based on individual mobile station in the coverage area of the base station 200 itself is taken into account.

In addition, when it is determined that a congestion state occurs, the base station 200 sets "1 (congestion state)" to a congestion state bit included in an broadcast signal, and notifies all mobile stations of the broadcast signal. In addition, individual mobile stations detect it from the congestion state bit included in the broadcast signal that the base station 200 gives notice of that communication is in a congestion state.

On the other hand, for example, when initial access is performed in the congestion state, the mobile station that makes an emergency call randomly selects a sequence number from among fixed sequence numbers (for example, sequence numbers 1 to 5) preliminarily determined for the emergency call. In addition, the mobile station that makes an emergency call makes a connection setup request to the base station 200 using a signal sequence that corresponds to the selected sequence number, thereby connecting to the base station 200. In addition, for example, when initial access is performed in the congestion state, the mobile station that makes a normal call randomly selects a sequence number from among fixed sequence numbers (for example, sequence numbers 6 to 64) preliminarily determined for the normal call. In addition, the mobile station that makes a normal call makes a connection setup request to the base station 200 using a signal sequence that corresponds to the selected sequence number, thereby connecting to the base station 200.

Figure 29:
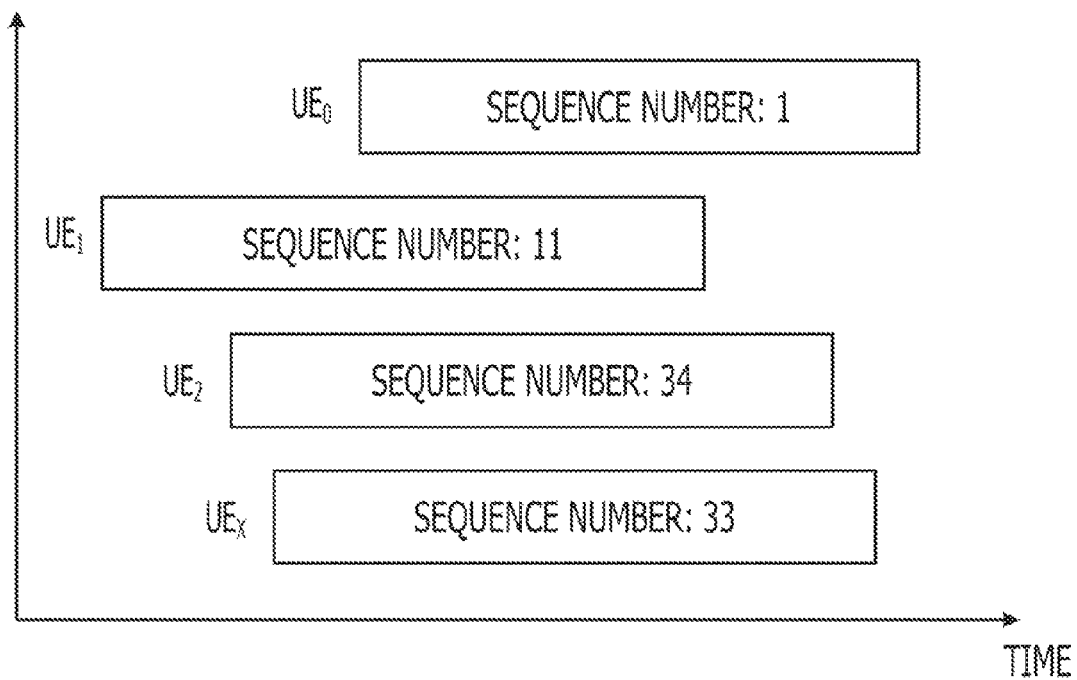
FIG. 29 is a diagram illustrating a usage example of a sequence number used by a mobile station in which a sequence number is fixed according to the fifth embodiment.
Figure 30:
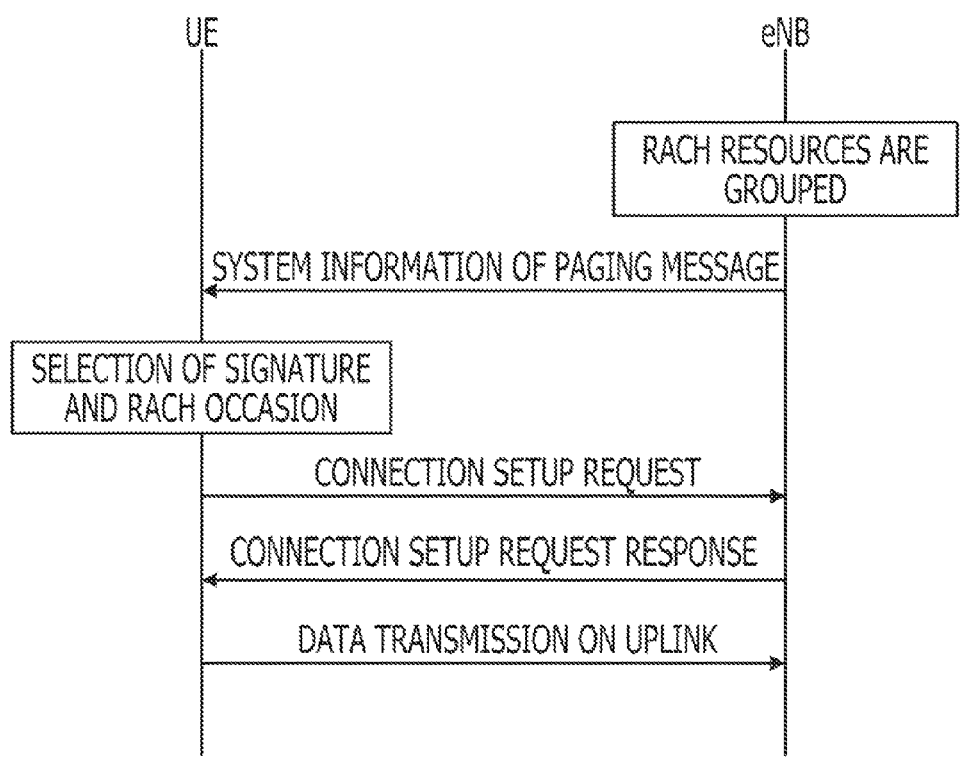
FIG. 30 is a flowchart of a processing operation in which resources are grouped for individual objects of connection setup requests.

Next, a usage example of a sequence number used by a mobile station in which a sequence number is fixed according to the fifth embodiment. FIG. 29 is a diagram illustrating the usage example of the sequence number used by the mobile station in which the sequence number is fixed according to the fifth embodiment.

For example, as illustrated in FIG. 29, in such a configuration as illustrated in FIG. 28, the $UE_0$ randomly selects a sequence number "1" of a connection setup request signal used for an emergency call, and makes a connection setup request to the base station 200 using a signal sequence that corresponds to the selected sequence number, thereby connecting to the base station 200. In addition, for example, in such a configuration as illustrated in FIG. 28, the $UE_1$ randomly selects a sequence number "11" of a connection setup request signal used for a normal call, and makes a connection setup request to the base station 200 using a signal sequence that corresponds to the selected sequence number, thereby connecting to the base station 200.

In addition, for example, in such a configuration as illustrated in FIG. 28, the $UE_2$ randomly selects a sequence number "34" of a connection setup request signal used for a normal call, and makes a connection setup request to the base station 200 using a signal sequence that corresponds to the selected sequence number, thereby connecting to the base station 200. In addition, for example, in such a configuration as illustrated in FIG. 28, the $UE_x$ randomly selects a sequence number "33" of a connection setup request signal used for a normal call, and makes a connection setup request to the base station 200 using a signal sequence that corresponds to the selected sequence number, thereby connecting to the base station 200.

(2) Configurations of Individual Devices

In addition, the processing procedure, the control procedure, the specific names, information including various kinds of data and parameters (for example, a specific name of "sequence number" or the like), which are illustrated in the description mentioned above and the figures may be arbitrarily changed except when these are specified.

In addition, individual configuration elements in the mobile station and the base station illustrated in figures are functional or conceptual ones, and it is not necessary to physically configure the configuration elements as illustrated in figures. Namely, specific forms of the distribution and/or the integration of individual devices are not limited to the examples illustrated in figures, and the all parts or a part thereof may be functionally or physically distributed and/or integrated in arbitrary units in accordance with various kinds of loads, usage situations, or the like. For example, the antenna 101 or the antenna 151 may be distributed into a transmitting antenna and a receiving antenna. In addition, since the correlation calculation unit 112c, the correlation result memory unit 112d, and the like are adjustable in response to the number of sequence numbers, the number of sequence numbers is not limited to "64". In addition, if a normal specification other than LTE is adopted, the correlation calculation unit 112c, the correlation result memory unit 112d, and the like are adjustable according to the normal specification.

A mobile station, a base station, and a wireless communication method of the disclosed embodiments may suppress the deterioration of connection for a connection setup request.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A mobile station that performs wireless communication through a base station, comprising:
   a processor coupled to a memory, configured to
   make a first connection setup request for one of an emergency call and a normal call when communication performed in the communication region of the base station is in a congestion state, the one of the emergency call and the normal call using a signal sequence that corresponds to a sequence number of a connection setup request signal used when communication performed in a communication region of the base station is in a normal state, and make a second connection setup request for another one of the emergency call and the normal call different from the first connection setup request, using a generated-signal sequence generated from the sequence number, when communication performed in the communication region of the base station is in the congestion state.

2. The mobile station according to claim 1, wherein the processor is configured to make the second connection setup request using a generated-signal sequence generated by combining sequence numbers of connection setup request signals used when communication is in the normal state.

3. The mobile station according to claim 1, wherein the processor is configured to make the second call using a generated-signal sequence generated from a signal sequence that intermittently occurs during some of all intervals of a time period for a connection setup request.

4. A wireless communication method performed in a wireless communication system that includes a base station and mobile stations, the wireless communication method comprising:

determining whether or not communication performed in a communication region of the base station is in a congestion state;

notifying the mobile stations of a signal that includes congestion state information indicating that the communication is in the congestion state, when determined that the communication is in the congestion state;

making a first connection setup request for one of an emergency call and a normal call when each of the mobile stations is notified of the signal that includes congestion state information and when communication performed in the communication region of the base station is in a congestion state, the one of the emergency call and the normal call using a signal sequence that corresponds to a sequence number of a connection setup request signal used when communication performed in a communication region of the base station is in a normal state; and making a second connection setup request for another one of the emergency call and the normal call different from the first connection setup request, using a generated-signal sequence generated from the sequence number, when each of the mobile stations is notified of the signal that includes congestion state information.

5. The wireless communication method according to claim 4, wherein the making second connection setup request includes making the second connection setup request using a generated-signal sequence generated by combining sequence numbers of connection setup request signals used when communication is in the normal state.

6. The wireless communication method according to claim 4, wherein the making second connection setup request includes making the second connection setup request using a generated-signal sequence generated from a signal sequence that intermittently occurs during some of all intervals of a time period for a connection setup request.

7. The wireless communication method according to claim 4, further comprising:

evaluating a correlation value for all intervals and correlation values for individual intervals during an entire time period for a connection setup request with respect to each of the mobile stations, based on the sequence numbers of the connection setup request signals transmitted both by the first connection setup request and the second connection setup request; and distinguishing whether a connection setup request of each of the mobile stations is an emergency call or a normal call based on the correlation values.

8. A base station establishing wireless communication with a mobile station, the base station comprising:

a processor coupled to a memory, configured to determine whether or not communication performed in a communication region of the base station is in a congestion state, and notify the mobile station of a signal that includes congestion state information indicating that the communication is in the congestion state, the signal being used for the mobile station to make a first connection setup request for one of an emergency call and a normal call when the communication is in the congestion state, the one of the emergency call and the normal call using a signal sequence that corresponds to a sequence number of a connection setup request signal used when communication performed in a communication region of the base station is in a normal state, and to make a second connection setup request for another one of the emergency call and the normal call different from the first connection setup request, using a generated-signal sequence generated from the sequence number, when the communication is in the congestion state.

9. The base station according to claim 8, wherein the processor is configured to evaluate a correlation value for all intervals and correlation values for individual intervals during an entire time period for a connection setup request with respect to each of the mobile stations, based on sequence numbers of connection setup request signals transmitted both by the first connection setup request and the second connection setup request, and distinguish whether a connection setup request of each of the mobile stations is an emergency call or a normal call based on the correlation values.

* * * * *